(12) United States Patent
Morgan et al.

(10) Patent No.: US 10,081,142 B2
(45) Date of Patent: Sep. 25, 2018

(54) METHOD FOR PRODUCING CONTACT LENSES WITH A LUBRICIOUS SURFACE

(71) Applicant: Novartis AG, Basel (CH)

(72) Inventors: Courtney Flem Morgan, Alpharetta, GA (US); Larry Allen Alvord, Gainesville, GA (US)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 15/376,698

(22) Filed: Dec. 13, 2016

(65) Prior Publication Data

US 2017/0165930 A1   Jun. 15, 2017

Related U.S. Application Data

(60) Provisional application No. 62/267,309, filed on Dec. 15, 2015.

(51) Int. Cl.

| | |
|---|---|
| *B29D 11/00* | (2006.01) |
| *C09D 133/02* | (2006.01) |
| *G02C 7/04* | (2006.01) |
| *B29K 33/00* | (2006.01) |
| *B29K 83/00* | (2006.01) |

(52) U.S. Cl.
CPC .... *B29D 11/00057* (2013.01); *B29D 11/0098* (2013.01); *B29D 11/00134* (2013.01); *B29D 11/00865* (2013.01); *C09D 133/02* (2013.01); *G02C 7/049* (2013.01); *B29K 2033/26* (2013.01); *B29K 2083/00* (2013.01); *B29K 2995/0018* (2013.01); *B29K 2995/0065* (2013.01); *B29K 2995/0092* (2013.01); *G02C 2202/16* (2013.01)

(58) Field of Classification Search
CPC ........................ B29D 11/00134; G02C 7/049
See application file for complete search history.

(56) References Cited

U.S. PATENT DOCUMENTS

| | | |
|---|---|---|
| 3,408,429 A | 10/1968 | Wichterle |
| 4,136,250 A | 1/1979 | Mueller et al. |
| 4,143,949 A | 3/1979 | Chen |
| 4,153,641 A | 5/1979 | Deichert et al. |
| 4,182,822 A | 1/1980 | Chang |
| 4,189,546 A | 2/1980 | Deichert et al. |
| 4,254,248 A | 3/1981 | Friends et al. |
| 4,259,467 A | 3/1981 | Keogh et al. |

(Continued)

FOREIGN PATENT DOCUMENTS

| | | |
|---|---|---|
| EP | 632329 A1 | 1/1995 |
| JP | 200175060 A | 3/2001 |
| WO | 2009094368 A1 | 7/2009 |

OTHER PUBLICATIONS

Mattox, D.M.; The Application of Plasmas to Thin Film Deposition Processes, O. Auciello et al. (eds.), Plasma-Surface Interactions and Processing of Materials, pp. 377-399, 1990, Kluwer Academic Publishers.

(Continued)

*Primary Examiner* — Elizabeth A Burkhart
(74) *Attorney, Agent, or Firm* — Jian Zhou

(57) ABSTRACT

The invention is related to method for developing and producing contact lenses with a target lubricity profile as characterized by having a velocity-weighted average coefficient of friction, as determined by use of a lubricity test of the invention.

19 Claims, 8 Drawing Sheets

(56) References Cited

U.S. PATENT DOCUMENTS

| | | | |
|---|---|---|---|
| 4,260,725 A | 4/1981 | Keogh et al. |
| 4,261,875 A | 4/1981 | LeBoeuf |
| 4,276,402 A | 6/1981 | Chromecek et al. |
| 4,312,575 A | 1/1982 | Peyman et al. |
| 4,327,203 A | 4/1982 | Deichert et al. |
| 4,341,889 A | 7/1982 | Deichert et al. |
| 4,343,927 A | 8/1982 | Chang |
| 4,347,198 A | 8/1982 | Ohkada et al. |
| 4,355,147 A | 10/1982 | Deichert et al. |
| 4,444,711 A | 4/1984 | Schad |
| 4,460,534 A | 7/1984 | Boehm et al. |
| 4,486,577 A | 12/1984 | Mueller et al. |
| 4,543,398 A | 9/1985 | Bany et al. |
| 4,605,712 A | 8/1986 | Mueller et al. |
| 4,661,575 A | 4/1987 | Tom |
| 4,684,538 A | 8/1987 | Klemarczyk |
| 4,703,097 A | 10/1987 | Wingler et al. |
| 4,833,218 A | 5/1989 | Lee |
| 4,837,289 A | 6/1989 | Mueller et al. |
| 4,954,586 A | 9/1990 | Toyoshima et al. |
| 4,954,587 A | 9/1990 | Mueller |
| 5,010,141 A | 4/1991 | Mueller |
| 5,034,461 A | 7/1991 | Lai et al. |
| 5,039,761 A | 8/1991 | Ono et al. |
| 5,070,170 A | 12/1991 | Robertson et al. |
| 5,079,319 A | 1/1992 | Mueller |
| 5,346,946 A | 9/1994 | Yokoyama et al. |
| 5,352,714 A | 10/1994 | Lai et al. |
| 5,358,995 A | 10/1994 | Lai et al. |
| 5,387,632 A | 2/1995 | Lai et al. |
| 5,416,132 A | 5/1995 | Yokoyama et al. |
| 5,451,617 A | 9/1995 | Lai et al. |
| 5,464,667 A | 11/1995 | Kohler et al. |
| 5,486,579 A | 1/1996 | Lai et al. |
| 5,508,317 A | 4/1996 | Müller |
| 5,583,163 A | 12/1996 | Müller |
| 5,599,576 A | 2/1997 | Opolski |
| 5,665,840 A | 9/1997 | Pohlmann et al. |
| 5,712,356 A | 1/1998 | Bothe et al. |
| 5,760,100 A | 6/1998 | Nicholson et al. |
| 5,766,158 A | 6/1998 | Opolski |
| 5,789,464 A | 8/1998 | Müller |
| 5,843,346 A | 12/1998 | Morrill |
| 5,849,810 A | 12/1998 | Müller |
| 5,849,841 A | 12/1998 | Muhlebach et al. |
| 5,894,002 A | 4/1999 | Boneberger et al. |
| 5,962,548 A | 10/1999 | Vanderlaan et al. |
| 5,981,675 A | 11/1999 | Valint et al. |
| 6,039,913 A | 3/2000 | Hirt et al. |
| 6,087,415 A | 7/2000 | Vanderlaan et al. |
| 6,096,726 A | 8/2000 | Opalski |
| 6,099,122 A | 8/2000 | Chabrecek et al. |
| 6,165,408 A | 12/2000 | Steinmann |
| 6,221,303 B1 | 4/2001 | Steinmann |
| 6,303,687 B1 | 10/2001 | Müller |
| 6,340,465 B1 | 1/2002 | Hsu et al. |
| 6,367,929 B1 | 4/2002 | Maiden et al. |
| 6,436,481 B1 | 8/2002 | Chabrecek et al. |
| 6,440,571 B1 | 8/2002 | Valint et al. |
| 6,447,920 B1 | 9/2002 | Chabrecek et al. |
| 6,451,871 B1 | 9/2002 | Winterton et al. |
| 6,465,056 B1 | 10/2002 | Chabrecek et al. |
| 6,472,489 B1 | 10/2002 | Stockinger |
| 6,479,587 B1 | 11/2002 | Stockinger et al. |
| 6,492,478 B1 | 12/2002 | Steinmann |
| 6,500,481 B1 | 12/2002 | Vanderlaan et al. |
| 6,521,352 B1 | 2/2003 | Chabrecek et al. |
| 6,534,559 B1 | 3/2003 | Vanderlaan et al. |
| 6,586,038 B1 | 7/2003 | Chabrecek et al. |
| 6,623,747 B1 | 9/2003 | Chatelier et al. |
| 6,627,124 B1 | 9/2003 | Herbrechtsmeier et al. |
| 6,683,062 B2 | 1/2004 | Opalski |
| 6,719,929 B2 | 4/2004 | Winterton et al. |
| 6,730,366 B2 | 5/2004 | Lohmann et al. |
| 6,734,321 B2 | 5/2004 | Chabrecek et al. |
| 6,762,264 B2 | 7/2004 | Künzler et al. |
| 6,793,973 B2 | 9/2004 | Winterton et al. |
| 6,800,225 B1 | 10/2004 | Hagmann et al. |
| 6,811,805 B2 | 11/2004 | Gilliard et al. |
| 6,835,410 B2 | 12/2004 | Chabrecek et al. |
| 6,838,491 B1 | 1/2005 | Vanderlaan et al. |
| 6,866,936 B2 | 3/2005 | Opalski |
| 6,867,245 B2 | 3/2005 | Iwata et al. |
| 6,878,399 B2 | 4/2005 | Chabrecek et al. |
| 6,881,269 B2 | 4/2005 | Matsuzawa et al. |
| 6,896,926 B2 | 5/2005 | Qiu et al. |
| 6,923,978 B2 | 8/2005 | Chatelier et al. |
| 6,940,580 B2 | 9/2005 | Winterton et al. |
| 6,995,192 B2 | 2/2006 | Phelan et al. |
| 7,078,074 B2 | 7/2006 | Matsuzawa et al. |
| 7,268,198 B2 | 9/2007 | Kunzler et al. |
| 7,384,590 B2 | 6/2008 | Kelly et al. |
| 7,387,759 B2 | 6/2008 | Kelly et al. |
| 7,461,937 B2 | 12/2008 | Steffen et al. |
| 7,540,609 B2 | 6/2009 | Chen et al. |
| 7,572,841 B2 | 8/2009 | Chen et al. |
| 7,605,190 B2 | 10/2009 | Moszner et al. |
| 7,915,323 B2 | 3/2011 | Awasthi et al. |
| 7,977,430 B2 | 7/2011 | Devlin et al. |
| 8,044,112 B2 | 10/2011 | Matsuzawa |
| 8,048,968 B2 | 11/2011 | Phelan et al. |
| 8,129,442 B2 | 3/2012 | Ueyama et al. |
| 8,147,897 B2 | 4/2012 | Ferreiro et al. |
| 8,158,192 B2 | 4/2012 | Bothe et al. |
| 8,404,759 B2 | 3/2013 | Phelan et al. |
| 8,420,711 B2 | 4/2013 | Awasthi et al. |
| 8,480,227 B2 | 7/2013 | Qiu et al. |
| 8,524,850 B2 | 9/2013 | Ueyama et al. |
| 8,529,057 B2 | 9/2013 | Qiu et al. |
| 8,703,891 B2 | 4/2014 | Broad |
| 8,772,367 B2 | 7/2014 | Saxena et al. |
| 8,835,525 B2 | 9/2014 | Kuyu et al. |
| 8,865,789 B2 | 10/2014 | Yao et al. |
| 8,937,110 B2 | 1/2015 | Alli et al. |
| 8,937,111 B2 | 1/2015 | Alli et al. |
| 8,993,651 B2 | 3/2015 | Chang et al. |
| 9,151,873 B2 | 10/2015 | Chang et al. |
| 9,156,213 B2 | 10/2015 | Alli et al. |
| 9,187,601 B2 | 11/2015 | Huang et al. |
| 9,720,138 B2 | 8/2017 | Chang et al. |
| 2005/0179862 A1* | 8/2005 | Steffen .................. C08F 220/60 351/159.33 |
| 2007/0122540 A1 | 5/2007 | Salamone et al. |
| 2008/0142038 A1 | 6/2008 | Kunzler et al. |
| 2009/0145086 A1 | 6/2009 | Reynolds et al. |
| 2009/0145091 A1 | 6/2009 | Connolly et al. |
| 2012/0026457 A1* | 2/2012 | Qiu ....................... G02B 1/043 351/159.33 |
| 2012/0088843 A1 | 4/2012 | Chang et al. |
| 2012/0088844 A1 | 4/2012 | Kuyu et al. |
| 2012/0088861 A1 | 4/2012 | Huang et al. |
| 2012/0137635 A1* | 6/2012 | Qiu .................. B29D 11/00038 53/433 |
| 2012/0244088 A1 | 9/2012 | Saxena et al. |
| 2012/0245249 A1 | 9/2012 | Saxena et al. |
| 2014/0171543 A1 | 6/2014 | Chang et al. |
| 2014/0179867 A1* | 6/2014 | Nunez ...................... C08K 5/55 524/701 |
| 2016/0061995 A1 | 3/2016 | Chang et al. |

OTHER PUBLICATIONS

Brennan, Noel; Contact Lens-Based Correlates of Soft Lens Wearing Comfort; Optometry and Vision Science, 2009; Abstract.

Chantal Coles and Noel Brennan; Coefficient of Friction and Soft Contact Lens Comfort, American Academy of Optometry, Optometry and Vision Science, 2012; Abstract.

N. Dilsiz and G. Akovali; Plasma polymerization of selected organic compounds; Polymer, Elsevier Science Ltd, 1996, vol. 37, No. 2, pp. 333-342.

Alison C. Dunn, Juan Manuel Uruena, Yuchen Huo, Scott S. Perry, Thomas E Angelini, and W. Gregory Sawyer, Lubricity of Surface Hydrogel Layers; Tribol Lett, 2013, 49, pp. 371-378.

(56) References Cited

OTHER PUBLICATIONS

Desmond Fonn; The Clinical Relevance of Contact Lens Lubricity, Using science to provide better comfort for contact lens wearers; Contact Lens Spectrum, Jun. 2013.

Chung-Peng Ho and H. Yasuda; Ultrathin Coating of Plasma Polymer of Methane Applied on the Surface of Silicone Contact Lenses; Journal of Biomedical Materials Research, vol. 22, pp. 919-937 (1988); Rolla, Missouri.

Lyndon Jones, Noel A. Brennan, Jose Gonzalez-Merijome, John Lally, Carole Maldonado-Codina, Tannin A. Schmidt, Lakshman Subbaraman, Graeme Young, Jason J. Nichols, The TFOS International Workshop on Contact Lens Discomfort: Report of the Contact Lens Materials, Design and Care Subcommittee; Investigative Ophthalmology & Visual Science, The Association for Research in Vision and Ophthalmology, Inc., Oct. 2013, vol. 54, No. 11, pp. 37-70.

Jami Kern, Joseph Rappon, Erich Bauman, and Ben Vaughn; Assessment of the relationship between contact lens coefficient of friction and subject lens comfort; ARVO Annual Meeting Abstract; Investigative Ophthalmology & Visual Science, Jun. 2013, vol. 54, 494, Abstract.

Seong Han Kim, Aric Opdahl, Chris Marmo, Gabor A. Somorjai; AFM and SFG studies of pHEMA-based hydrogel contact lens surfaces in saline solution: adhesion, friction, and the presence of non-crosslinked polymer chains at the surface; Biomaterials 23, Elsevier Science Ltd., 2002, pp. 1657-1666.

Seong Han Kim, Chris Marmo, Gabor A. Somorjai; Friction studies of hydrogel contact lenses using AFM: non-crosslinked polymers of low friction at the surface; Biomaterials 22, Elsevier Science Ltd., 2001, pp. 3285-3294.

Kyung-Ah Kwon, Rebecca J. Shipley, Mohan Edirisinghe, Daniel G. Erza, Geoff Rose, Serena M. Best and Ruth E. Cameron, High-speed camera characterization of voluntary eye blinking kinematics; Journal of the Royal Society Interface, 2013, 10: 20130227.

Yu-Chin Lai and Gary D. Friends; Surface wettability enhancement of silicone hydrogel lenses by processing with polar plastic molds; John Wiley & Sons, Inc., 1997, pp. 349-356.

Mingjie Liu, Yasuhiro Ishida, Yasuo Ebina, Takayoshi Sasaki, Takaaki Hikima, Masaki Takata, and Takuzo Aida; An anisotropic hydrogel with electrostatic repulsion between cofacially aligned nanosheets; Nature, vol. 517, Jan. 2015, Macmillan Publishers Limited, pp. 68-72.

A. C. Rennie, P. L. Dickrell, and W. G. Sawyer; Friction coefficient of soft contact lenses: measurements and modeling; Tribology Letters, vol. 18, No. 4, Apr. 2005, pp. 499-504.

M. Roba, E. G. Duncan, G. A. Hill, N. D. Spencer, and S. G. P. Tosatti; Friction Measurements on Contact Lenses in Their Operating Environment; Tribol Lett (2011) 44(3): pp. 387-397; DOI: 10.1007/s11249-011-9856-9.

Alyra J. Shaw, Michael J. Collins, Brett A. Davis, and Leo G. Carney; Eyelid Pressure and Contact with the Ocular Surface; Investigative Ophthalmology & Visual Science, Apr. 2010, vol. 51, No. 4, pp. 1911-1917.

Lakshman N. Subbaraman and Lyndon W. Jones; Measuring Friction and Lubricity of Soft Contact Lenses: A Review; Contact Lens Spectrum; 2013.

John M. Tiffany; Measurement of wettability of the corneal epithelium II. Contact Angle Method; Acta Ophthalmologica; 1990, vol. 68, pp. 182-187.

Juan Manuel Uruena, Angela A. Pitenis, Ryan M. Nixon, Kyle D. Schulze, Thomas E. Angelini and W. Gregory Sawyer; Mesh Size Control of Polymer Fluctuation Lubrication in Gemini Hydrogels; Biotribology 1-2, 2015, pp. 24-29.

Jalaiah Varikooty, Nancy Keir, Doris Richter, Lyndon W. Jones, Craig Woods, and Desmond Fonn; Comfort Response of Three Silicone Hydrogel Daily Disposable Contact Lenses, Optometry and Vision Science, American Academy of Optometry, 2013, vol. 90, No. 9, pp. 945-953.

H. Yasuda; Glow Discharge Polymerization; Journal of Polymer Science: Macromolecular Reviews, John Wiley & Sons, Inc., 1981, vol. 16, pp. 199-293.

Frank Jansen; Chapter 1, Plasma Deposition Processes; Plasma Deposited Thin Films, Editors—J. Mort and F. Jansen; CRC Press, Inc., 1986, pp. 1-19.

R. Hartmann; Plasma Polymerisation: Grundlagen, Technik and Anwendung, Jahrb. Oberflächentechnik (1993) 49, pp. 283-296; Google translated to "Yearbook Basic technology Tape 49, Plasma Basics, technology and applications." No translation was available other than a rough Google translation that is attached.

* cited by examiner

METHOD FOR PRODUCING CONTACT LENSES WITH A LUBRICIOUS SURFACE

This application claims the benefit under 35 USC § 119 (e) of U.S. provisional application No. 62/267,309 filed 15 Dec. 2015, herein incorporated by reference in its entirety.

The present invention generally relates to a method for producing silicone hydrogel contact lenses having a target lubricity profile.

BACKGROUND

Contact lenses are widely used for correcting many different types of vision deficiencies. These include defects such as near-sightedness and far-sightedness (myopia and hypermetropia, respectively), and defects in near range vision usually associated with aging (presbyopia). The advantages of contact lens wear are numerous. Improved convenience and improved appearance in comparison to spectacle glasses are probably the two most important advantages to most consumers. However, contact lens wearing discomfort is one of the predominant reasons for discontinuation of contact lens wear. Contact lenses manufacturers have made a great effort in developing contact lenses with minimized wearing discomfort.

Contact lens wearing discomfort can be influenced by many factors. It is believed that the lubricity of a contact lens can be directly associated with contact lens wearing comfort, because there exist inevitably interactions between the lens's posterior surface and the corneal surface and between the lens's anterior surface and the posterior surface of the eyelid during the blink when being worn by a patient on eye. Lubricity describes the slipperiness of a surface, and generally can be characterized by its coefficient of friction (CoF) which is measured in vitro as the ratio of the horizontal friction force between two bodies and the force pressing them together (or normal force). The lower the CoF is, the more lubricious the surface. Recent studies indicate a correlation between the in vitro measurements of coefficient of friction (CoF) of hydrogel contact lenses and subjective comfort (Brennan NA., Optom Vis Sci 2009; 86:e-abstract 90957; Coles CML, Brennan NA., Optom Vis Sci 2012; 88:e-abstract 125603; Kern J, Rappon J, Bauman E, Vaughn B., Invest Ophthalmol Vis Sci 2013; ARVO E-Abstract 494; Jones L, Brennan N A, Gonzalez-Meijome J, Lally J, Maldonado-Codina C, Schmidt T A, Subbaraman L, Young G, Nichols J, members of the TIWoCLD, Invest Ophthalmol Vis Sci 2013; 54:TFOS37-70; Subbaraman L. N. and Jones L. W., Contact Lens Spectrum 28:28-33 (2013); Fonn D., Contact Lens Spectrum 28:28-33 (2013), herein incorporated by references in their entireties).

Unlike most physical properties of a material, CoF is not an intrinsic material property, but instead should be considered more correctly as a system property, because it depends upon many variables of a contact lens under testing and of a testing system, including materials used, a probing substrate against which a contact lens under test is moved, contact mode (e.g., a constant point of contact, a moving point of contact), normal force pressure, moving speed relative to each other, and lubricating fluid between the probing substrate and the testing lens, etc. Different methods has been developed/used in measuring in vitro the lubricity of contact lenses, such as, a tribometer (Rennie A. C., Dickrell P. L., Sawyer W. G., Tribology Letters 2005, 18:499-504; Roba M., Duncan E. G., Hill G. A., Spencer N. D., Tosatti S. G. P., Tribology Letters 2011, 44:387-97; U.S. Pat. No. 6,940,580, herein incorporated by references in their entireties), atomic force microscopy (Kim S. H., Marmo C., Somorjai G. A., Biomaterials 2001, 22:3285-94; Kim S. H., Opdahl A., Marmo C., Somorjai G. A., Biomaterials 2002, 23:1657-66, herein incorporated by references in their entireties), an inclined plane method (U.S. Pat. No. 8,480,227, herein incorporated by reference in its entirety), lubricity ratings based on digital rubbing of lenses between the fingers (U.S. Pat. No. 8,480,227). However, those previously reported methods are not suitable for high throughput in vitro measurements of friction of coefficient and for generating lubricity date. The development and production of silicone hydrogel contact lenses with a highly lubricious surface could benefit greatly from a predictive method for selection a lens formulation for forming silicone hydrogel contact lenses having a target lubricity of a coating material and formation of a coating on a contact lens without undue reliance on clinical trials. While one cannot eliminate such clinical trials, better predictive models will streamline selection processes of lens forming materials or coating materials by reducing the number of different options to be tested. They would also provide a means for distinguishing useful and beneficial lens forming materials and curing conditions from lens forming materials and curing conditions that are not so useful or beneficial for obtaining silicone hydrogel contact lenses with a highly lubricious coating during development and production of contact lenses, or useful and beneficial coating materials and coating conditions from coating materials and coating conditions that are not so useful or beneficial for obtaining a highly lubricious coating during development and production of contact lenses.

Therefore, there is still a need for methods for determining in vitro CoF of a contact lens and for developing and producing contact lenses with a target lubricity, involving use of a lubricity test of the invention.

SUMMARY OF THE INVENTION

The invention, in one aspect, provides a method for producing silicone hydrogel contact lenses according to procedure (I) or (II), wherein procedure (I) comprises the steps of: (a) obtaining preformed contact lenses; (b) selecting a surface treatment or a combination of two or more surface treatments, coating materials, and coating conditions under which the selected coating materials can be applied onto a contact lens according to the selected surface treatment or the selected combination the two or more surface treatments to obtain a coated contact lens having a first target lubricity profile as characterized by having a weighted average coefficient of friction, $\overline{CoF_y}$, of about $250 \times 10^{-3}$ or less (preferably about $225 \times 10^{-3}$ or less, more preferably about $250 \times 10^{-3}$ or less, even more preferably about $200 \times 10^{-3}$ or less, most preferably about $175 \times 10^{-3}$ or less); and (c) applying the selected coating materials onto the preformed contact lenses under the selected coating conditions to form the contact lenses each having the first target lubricity profile, wherein procedure (II) comprises the steps of: (a) selecting a mold material for making lens molds; (b) selecting a lens formulation and curing conditions under which the selected lens formulation can be cured in the selected mold under the selected curing conditions to form a contact lens having a second target lubricity profile as characterized by having a velocity-weighted average coefficient of friction, $\overline{CoF_y}$, of about $250 \times 10^{-3}$ or less (preferably about $225 \times 10^{-3}$ or less, more preferably about 250×10⁻³ or less, even more preferably about 200×10⁻³ or less, most preferably about 175× 10⁻³ or less), wherein the lens formulation comprises at least one lubricating agent for imparting the second target lubricity profile to the formed contact lens; and (c) introducing and curing the selected lens formulation in the lens molds to form the contact lenses (preferably hydrogel contact lenses, more preferably silicone hydrogel contact lenses) each having the second target lubricity profile.

In another aspect, the invention provides a method of manufacturing contact lenses (preferably hydrogel contact lenses, more preferably silicone hydrogel contact lenses), comprising the step of: inspecting manufactured contact lenses for having a target lubricity profile as characterized by having a velocity-weighted average coefficient of friction, $\overline{CoF_v}$, of about 250×10⁻³ or less (preferably about 225×10⁻³ or less, more preferably about 250×10⁻³ or less, even more preferably about 200×10⁻³ or less, most preferably about 175×10⁻³ or less); and discarding those contact lenses which do not have the target lubricity. Preferably, the inspecting step is conducted by statistical sampling or conducted continuously on production line.

In a further aspect, the invention provides silicone hydrogel contact lenses having a highly lubricous surface obtained according to a method of the invention.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Figure 1:
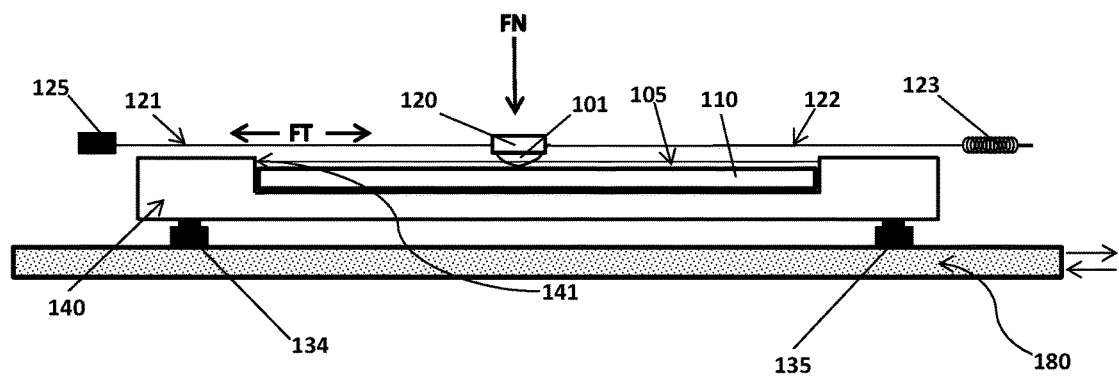
FIG. 1 schematically illustrates a testing system for measuring the CoF of a contact lens.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art. Also, as used in the specification including the appended claims, reference to singular forms such as "a," "an," and "the" include the plural, and reference to a particular numerical value includes at least that particular value, unless the context clearly dictates otherwise. "About" as used herein means that a number referred to as "about" comprises the recited number plus or minus 1-10% of that recited number.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel bulk (core) material.

A "hydrogel" refers to a crosslinked polymeric material which is not water-soluble and can contains at least 10% by weight of water within its polymer matrix when fully hydrated.

A "non-silicone hydrogel" refers to a hydrogel that is free of silicone.

A "silicone hydrogel" refers to a hydrogel containing silicone. A silicone hydrogel typically is obtained by copolymerization of a polymerizable composition comprising at least one silicone-containing vinylic monomer or at least one silicone-containing vinylic macromer or at least one silicone-containing prepolymer having ethylenically unsaturated groups.

As used in this application, the term "non-silicone hydrogel" refers to a hydrogel that is theoretically free of silicon.

A "vinylic monomer" refers to a compound that has one sole ethylenically unsaturated group, is soluble in a solvent, and can be polymerized actinically or thermally.

The term "soluble", in reference to a compound or material in a solvent, means that the compound or material can be dissolved in the solvent to give a solution with a concentration of at least about 0.1% by weight at room temperature (i.e., a temperature of about 22° C. to about 28° C.).

The term "insoluble", in reference to a compound or material in a solvent, means that the compound or material can be dissolved in the solvent to give a solution with a concentration of less than 0.005% by weight at room temperature (as defined above).

The term "olefinically unsaturated group" or "ethylenically unsaturated group" is employed herein in a broad sense and is intended to encompass any groups containing at least one >C=C< group. Exemplary ethylenically unsaturated groups include without limitation (meth)acryloyl methacryloyl

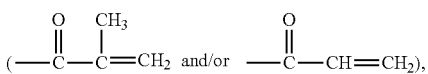

allyl, vinyl

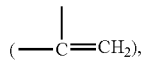

styrenyl, or other C=C containing groups.

The term "(meth)acrylamide" refers to methacrylamide and/or acrylamide.

The term "(meth)acrylate" refers to methacrylate and/or acrylate.

"Hydrophilic," as used herein, describes a material or portion thereof that will more readily associate with water than with lipids.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "macromer" or "prepolymer" refers to a compound or polymer that contains two or more ethylenically unsaturated groups and has an average molecular weight of greater than 700 Daltons.

As used in this application, the term "vinylic crosslinker" refers to a compound having at least two ethylenically unsaturated groups. A "vinylic crosslinking agent" refers to a vinylic crosslinker having a molecular weight of 700 Daltons or less.

As used in this application, the term "polymer" means a material formed by polymerizing/crosslinking one or more monomers or macromers or prepolymers or combinations thereof.

As used in this application, the term "molecular weight" of a polymeric material (including monomeric or macromeric materials) refers to the number average molecular weight unless otherwise specifically noted or unless testing conditions indicate otherwise.

A "polysiloxane" refers to a compound containing a polysiloxane segment of

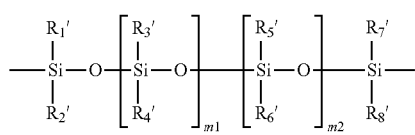

in which m1 and m2 independently of each other are an integer of from 0 to 500 and (m1+m2) is from 2 to 500, $R_1'$, $R_2'$, $R_3'$, $R_4'$, $R_5'$, $R_6'$, $R_7'$, and $R_8'$ independently of one another, are $C_1$-$C_{10}$ alkyl, $C_1$-$C_4$ alkyl- or $C_1$-$C_4$- alkoxy-substituted phenyl, $C_1$-$C_{10}$ fluoroalkyl, $C_1$-$C_{10}$ fluoroether, $C_6$-$C_{18}$ aryl radical, -alk-$(OC_2H_4)_{m3}$—OR' (in which alk is $C_1$-$C_6$ alkyl diradical, R' is H or $C_1$-$C_4$ alkyl and m3 is an integer from 1 to 10), or a linear hydrophilic polymer chain.

A "polycarbosiloxane" refers to a compound containing a polycarbosiloxane segment of

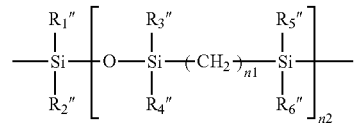

in which n1 is an integer of 2 or 3, n2 is an integer of from 2 to 100 (preferably from 2 to 20, more preferably from 2 to 10, even more preferably from 2 to 6), $R_1''$, $R_2''$, $R_3''$, $R_4''$, $R_5''$, and $R_6''$ independent of one another are a $C_1$-$C_6$ alkyl radical (preferably methyl).

The term "fluid" as used herein indicates that a material is capable of flowing like a liquid.

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkyl triradical" refers to a trivalent radical obtained by removing two hydrogen atoms from an alkyl. An alkyl triradical forms three bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxy (—OH), carboxy (—COOH), —$NH_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

In this application the term "azetidinium group" or "3-hydroxyazetidinium group" refers to a positively-charged, divalent radical (or group or moiety) of

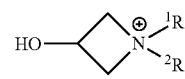

in which $^1R$ and $^2R$ are a hydrocarbon group.

The term "azlactone" refers to a mono-valent radical of formula

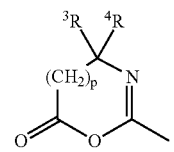

in which p is 0 or 1; $^3R$ and $^4R$ independently of each other is $C_1$-$C_8$ alkyl (preferably methyl).

As used in this application, the term "phosphorylcholine" refers to a monovalent zwitterionic group of

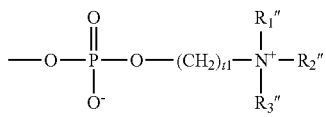

in which t1 is an integer of 1 to 5 and $R_1"$, $R_2"$ and $R_3"$ independently of one another are $C_1$-$C_8$ alkyl or $C_1$-$C_8$ hydroxyalkyl.

The term "reactive vinylic monomer" refers to a vinylic monomer having a reactive functional group selected from the group consisting of carboxyl groups (—COOH), azetidinium group, amino groups (i.e., primary and/or secondary amino groups), azlactone groups, isocyanate groups, epoxy groups, aziridine groups, or combinations thereof.

As used in this application, the term "non-reactive vinylic monomer" refers to any vinylic monomer (either hydrophilic or hydrophobic vinylic monomer) free of carboxyl group, primary amino group, secondary amino group, epoxide group, isocyanate group, azlactone group, or aziridine group. A non-reactive vinylic monomer can include a hydroxyl group or a tertiary or quaternium amino group.

In this application, an "oxazoline" refers to a compound of

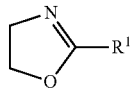

in which: $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); and m3 is an integer from 1 to 10 (preferably 1 to 5).

In this application, the term "polyoxazoline" refers to a linear polymer having a formula of

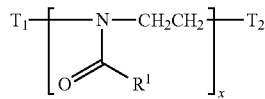

in which: T1 and T2 are two terminal groups; $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500. A polyoxazoline segment has a divalent polymer chain of a formula of

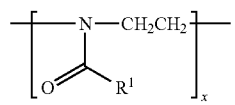

in which $R^1$ and x are as defined above.

In this application, the term "poly(2-oxazoline-co-ethyleneimine)" refers to a statistical copolymer having a formula of

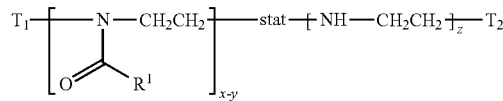

in which: T1 and T2 are terminal groups; $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500; z is an integer equal to or less than x. A poly(2-oxazoline-co-ethyleneimine) is obtained by hydrolyzing a polyoxazoline.

In this application, the term "poly(2-oxazoline-co-ethyleneimine)-epichlorohydrin" refers to a polymer obtained by reacting a poly(2-oxazoline-co-ethyleneimine) with epichlorohydrin to convert all or substantial percentage (≥90%) of the secondary amine groups of the poly(2-oxazoline-co-ethyleneimine) into azetidinium groups. Examples of poly (2-oxazoline-co-ethyleneimine)-epichlorohydrin are disclosed in U.S. pat. Appl. pub. No. 2016/0061995 A1 (herein incorporated by reference in its entirety).

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of the secondary amine groups of the polyamine or polyamidoamine into azetidinium groups.

The term "polyamidoamine-epichlorohydrin" refers to an epichlorohydrin-functionalized adipic acid-diethylenetriamine copolymer.

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at room temperature (i.e., from about 22° C. to about 28° C., preferably from about 24° C. to about 26° C., in particular at about 25° C.) to an extend detectable for a period of about one hour.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. A spatial limitation of UV radiation is obtained by using a mask or screen having a radiation (e.g., UV/visible) permeable region, a radiation (e.g., UV/visible) impermeable region surrounding the radiation-permeable region, and a projection contour which is the boundary between the radiation-impermeable and radiation-permeable regions, as schematically illustrated in the drawings of U.S. Pat. No. 6,800,225

(FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), all of which are incorporated by reference in their entireties. The mask or screen allows to spatially projects a beam of radiation (e.g., UV radiation) having a cross-sectional profile defined by the projection contour of the mask or screen. The projected beam of radiation (e.g., UV/visible radiation) limits radiation (e.g., UV/visible radiation) impinging on a lens formulation located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV/visible beam (i.e., a spatial limitation of radiation). The radiation used for the crosslinking is radiation energy, especially UV/visible radiation, gamma radiation, electron radiation or thermal radiation, the radiation energy preferably being in the form of a substantially parallel beam in order on the one hand to achieve good restriction and on the other hand efficient use of the energy.

The term "modulus" or "elastic modulus" in reference to a contact lens or a material means the tensile modulus or Young's modulus which is a measure of the stiffness of a contact lens or a material. The modulus can be measured using a method in accordance with ANSI Z80.20 standard. A person skilled in the art knows well how to determine the elastic modulus of a silicone hydrogel material or a contact lens. For example, all commercial contact lenses have reported values of elastic modulus.

An "organic-based solution" refers to a solution which is a homogeneous mixture consisting of an organic-based solvent and one or more solutes dissolved in the organic based solvent. An organic-based coating solution refers to an organic-based solution containing at least one polymeric coating material as a solute in the solution.

An "organic-based solvent" is intended to describe a solvent system which consists of one or more organic solvents and optionally about 40% or less, preferably about 30% or less, more preferably about 20% or less, even more preferably about 10% or less, in particular about 5% or less by weight of water relative to the weight of the solvent system.

The term "velocity-weighted average coefficient of friction" is designated as $\overline{CoF_v}$ and is equal to the area of a semi-logarithm plot of coefficient of friction as function of semi-logarithm of sliding velocity of a contact lens under test against a standard counter surface between the initial sliding velocity ($v_0^s$) and the final sliding velocity ($v_f^s$). It can be calculated according to Equation (1)

$$\overline{CoF_v} = \int_{v_0^s}^{v_f^s} \frac{CoF(v_i^s)}{v_i^s} d(v_i^s) \quad (1)$$

in which $CoF(v_i^s)$ is coefficient of friction $$\left(\frac{FT(v_i^s)}{FN}\right)$$

measured at a sliding speed $v_i^s$, FN is the applied normal force acting on the contact lens under test against the standard counter surface, and $FT(v_i^s)$ is the tangential force (or horizontal force) resulted from the sliding motion of the contact lens relative to the standard counter surface at the sliding speed $v_i^s$. The definite integral in Equation (1) can be computed according to any numerical methods known to a person skilled in the art. In accordance with the invention, FN, $FT(v_i^s)$, and $v_i^s$ are measured with a system of the invention over a sliding velocity range from 0.05 mm/s to 25 mm/s, as described in Example 1. According to the invention, a velocity-weighted average coefficient of friction $\overline{CoF_v}$ is weighted preferentially toward the contribution of friction of coefficients at low sliding velocities.

The invention is generally directed to a method for producing soft contact lenses with a target lubricity profile. The invention is partly based on the discoveries that a lubricity test developed here can be used either in selecting a silicone hydrogel lens formulation and curing conditions for forming uncoated silicone hydrogel contact lenses having a target lubricity profile, or in selecting a coating material and coating conditions for forming coated silicone hydrogel contact lenses having a target lubricity profile. It was found that by using a lubricity test, one can shortened/accelerate the development and production processes of silicone hydrogel contact lenses with a target lubricity profile, with minimized use of clinic trials. It allows for (1) quickly determining in vitro the lubricity profiles of any contact lenses; (2) selecting a silicone hydrogel lens formulation and curing conditions for forming uncoated silicone hydrogel contact lenses that can provide wearing comfort; (3) selecting a coating material and coating conditions for forming coated silicone hydrogel contact lenses that can provide wearing comfort; and (4) inspecting produced contact lenses for having a target lubricity profile to ensure the quality control in the production.

The invention, in one aspect, provides a method for producing contact lenses (preferably hydrogel contact lenses, more preferably silicone hydrogel contact lenses) according to procedure (I) or (II), wherein procedure (I) comprises the steps of: (a) obtaining preformed contact lenses; (b) selecting a surface treatment or a combination of two or more surface treatments, coating materials, and coating conditions under which the selected coating materials can be applied onto a contact lens according to the selected surface treatment or the selected combination of the two or more surface treatments to obtain a coated contact lens having a first target lubricity profile as characterized by having a weighted average coefficient of friction, $\overline{CoF_v}$, of about 450×10$^{-3}$ or less (preferably about 400×10$^{-3}$ or less, more preferably about 350×10$^{-3}$ or less, even more preferably about 250×10$^{-3}$ or less); and (c) applying the selected coating materials onto the preformed contact lenses under the selected coating conditions to form the contact lenses each having the first target lubricity profile, wherein procedure (II) comprises the steps of: (a) selecting a mold material for making lens molds; (b) selecting a lens formulation and curing conditions under which the selected lens formulation can be cured in the selected mold under the selected curing conditions to form a contact lens having a second target lubricity profile as characterized by having a velocity-weighted average coefficient of friction, $\overline{CoF_v}$, of about 450×10$^{-3}$ or less (preferably about 400×10$^{-3}$ or less, more preferably about 350×10$^{-3}$ or less, even more preferably about 250×10$^{-3}$ or less), wherein the lens formulation comprises at least one lubricating agent for imparting the second target lubricity profile to the formed contact lens; and (c) introducing and curing the selected lens formulation in the lens molds to form the contact lenses (preferably hydrogel contact lenses, more preferably silicone hydrogel contact lenses) each having the second target lubricity profile.

In accordance with the invention, a preformed contact lens is a contact lens that has not been subjected to any surface modification posterior to the lens-forming process well known to a person skilled in the art. For example, preformed contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of buttons as used in making customized contact lenses. In cast-molding, a lens formulation typically is dispensed into molds and cured (i.e., polymerized and/or crosslinked) in molds for making contact lenses.

For production of preformed hydrogel contact lenses, a hydrogel lens formulation typically is: either (1) a monomer mixture comprising (a) at least one hydrophilic vinylic monomer (e.g., hydroxyethyl methacrylate, glycerol methacrylate, N-vinylpyrrolidone, or combinations thereof) and (b) at least one component selected from the group consisting of a crosslinking agent, a hydrophobic vinylic monomer, a lubricating agent (or so-called internal wetting agents incorporated in a lens formulation), a free-radical initiator (photoinitiator or thermal initiator), a UV-absorbing agent, a visibility tinting agent (e.g., dyes, pigments, or mixtures thereof), antimicrobial agents (e.g., preferably silver nanoparticles), a bioactive agent, and combinations thereof; or (2) an aqueous solution comprising one or more water-soluble prepolymers and at least one component selected from the group consisting of hydrophilic vinylic monomer, a crosslinking agent, a hydrophobic vinylic monomer, a lubricating agent (or so-called internal wetting agents incorporated in a lens formulation), a free-radical initiator (photoinitiator or thermal initiator), a UV-absorbing agent, a visibility tinting agent (e.g., dyes, pigments, or mixtures thereof), antimicrobial agents (e.g., preferably silver nanoparticles), a bioactive agent, and combinations thereof. Resultant preformed hydrogel contact lenses then can be subjected to extraction with an extraction solvent to remove unpolymerized components from the resultant lenses and to hydration process, as known by a person skilled in the art. It is understood that a lubricating agent present in a hydrogel lens formulation can improve the lubricity of preformed hydrogel contact lenses compared to the lubricity of control preformed hydrogel contact lenses obtained from a control hydrogel lens formulation without the lubricating agent.

Examples of water-soluble prepolymers include without limitation: a water-soluble crosslinkable poly(vinyl alcohol) prepolymer described in U.S. Pat. Nos. 5,583,163 and 6,303,687; a water-soluble vinyl group-terminated polyurethane prepolymer described in U.S. Pat. No. 6,995,192; derivatives of a polyvinyl alcohol, polyethyleneimine or polyvinylamine, which are disclosed in U.S. Pat. No. 5,849,841; a water-soluble crosslinkable polyurea prepolymer described in U.S. Pat. Nos. 6,479,587 and 7,977,430; crosslinkable polyacrylamide; crosslinkable statistical copolymers of vinyl lactam, MMA and a comonomer, which are disclosed in U.S. Pat. No. 5,712,356; crosslinkable copolymers of vinyl lactam, vinyl acetate and vinyl alcohol, which are disclosed in U.S. Pat. No. 5,665,840; polyether-polyester copolymers with crosslinkable side chains which are disclosed in U.S. Pat. No. 6,492,478; branched polyalkylene glycol-urethane prepolymers disclosed in U.S. Pat. No. 6,165,408; polyalkylene glycol-tetra(meth)acrylate prepolymers disclosed in U.S. Pat. No. 6,221,303; crosslinkable polyallylamine gluconolactone prepolymers disclosed in U.S. Pat. No. 6,472,489; all of which are incorporated herein by references in their entireties.

For production of preformed silicone hydrogel (SiHy) contact lenses, a SiHy lens formulation for cast-molding or spin-cast molding or for making SiHy rods used in lathe-cutting of contact lenses generally comprises at least one components selected from the group consisting of a silicone-containing vinylic monomer, a silicone-containing vinylic macromer, a silicone-containing prepolymer, a hydrophilic vinylic monomer, a hydrophobic vinylic monomer, a cross-linking agent (a compound having a molecular weight of about 700 Daltons or less and containing at least two ethylenically unsaturated groups), a free-radical initiator (photoinitiator or thermal initiator), a hydrophilic vinylic macromer/prepolymer, and combination thereof, as well known to a person skilled in the art. A SiHy contact lens formulation can also comprise other necessary components known to a person skilled in the art, such as, for example, a UV-absorbing agent, a visibility tinting agent (e.g., dyes, pigments, or mixtures thereof), antimicrobial agents (e.g., preferably silver nanoparticles), a bioactive agent, lubricating agents (or so-called internal wetting agents incorporated in a lens formulation), leachable tear-stabilizing agents, and mixtures thereof, as known to a person skilled in the art. Resultant preformed SiHy contact lenses then can be subjected to extraction with an extraction solvent to remove unpolymerized components from the resultant lenses and to hydration process, as known by a person skilled in the art. It is understood that a lubricating agent present in a SiHy lens formulation can improve the lubricity of preformed SiHy contact lenses compared to the lubricity of control preformed SiHy contact lenses obtained from a control SiHy lens formulation without the lubricating agent.

Numerous SiHy lens formulations have been described in numerous patents and patent applications published by the filing date of this application. All of them can be used in obtaining a preformed SiHy lens which in turn becomes the inner layer of a SiHy contact lens of the invention, so long as they will yield a SiHy material free of carboxyl group(s). A SiHy lens formulation for making commercial SiHy lenses, such as, lotrafilcon A, lotrafilcon B, balafilcon A, galyfilcon A, senofilcon A, narafilcon A, narafilcon B, comfilcon A, enfilcon A, asmofilcon A, somofilcon A, stenfilcon A, smafilcon A, enfilcon A, and efrofilcon A can also be used in making preformed SiHy contact lenses.

Any suitable silicone-containing vinylic monomers can be used in the invention. Examples of preferred silicone-containing vinylic monomers include without limitation N-[tris(trimethylsiloxy)silylpropyl]-(meth)acrylamide, N-[tris(dimethylpropylsiloxy)-silylpropyl]-(meth)acrylamide, N-[tris(dimethylphenylsiloxy)silylpropyl] (meth)acrylamide, N-[tris(dimethylethylsiloxy)silylpropyl] (meth)acrylamide, N-(2-hydroxy-3-(3-(bis(trimethylsilyloxy)-methylsilyl)propyloxy)propyl)-2-methyl acrylamide; N-(2-hydroxy-3-(3-(bis(trimethylsilyloxy)-methylsilyl) propyloxy)propyl) acrylamide; N,N-bis[2-hydroxy-3-(3-(bis(trimethylsilyloxy)-methylsilyl)propyloxy)propyl]-2-methyl acrylamide; N, N-bis[2-hydroxy-3-(3-(bis (trimethylsilyloxy)-methylsilyl)propyloxy) propyl] acrylamide; N-(2-hydroxy-3-(3-(tris(trimethylsilyloxy)silyl)-propyloxy)propyl)-2-methyl acrylamide; N-(2-hydroxy-3-(3-(tris(trimethylsilyloxy)silyl)propyloxy)-propyl) acrylamide; N,N-bis[2-hydroxy-3-(3-(tris (trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl)propyloxy)propyl]-2-methyl acrylamide; N-[2-hydroxy-3-(3-(t-butyldimethylsilyl)propyloxy)propyl]acrylamide; N,N-bis[2-hydroxy-3-(3-(t-butyldimethylsilyl)-propyloxy)propyl]-2-methyl acrylamide; N,N-bis[2-hydroxy-3-(3-(t-butyldimethylsilyl) propyloxy)-propyl]acrylamide; 3-methacryloxy propylpentamethyldisiloxane, tris(trimethylsilyloxy)silylpropyl methacrylate (TRIS), (3-methacryloxy-2-hydroxypropyloxy) propylbis(trimethylsiloxy)-methylsilane), (3-methacryloxy-2-hydroxypropyloxy)propyltris(trimethylsiloxy)silane, 3-methacryloxy-2-(2-hydroxyethoxy)-propyloxy)propylbis (trimethylsiloxy)methylsilane, N-2-methacryloxyethyl-O-(methyl-bis-trimethylsiloxy-3-propyl)silylcarbamate, 3-(trimethylsilyl)-propylvinyl carbonate, 3-(vinyloxycarbonylthio)propyl-tris(trimethyl-siloxy)silane, 3-[tris(trimethyl-siloxy)silyl]propylvinyl carbamate, 3-[tris(trimethylsiloxy)silyl] propyl allyl carbamate, 3-[tris(trimethylsiloxy) silyl]propyl vinyl carbonate, t-butyldimethyl-siloxyethyl vinyl carbonate; trimethylsilylethyl vinyl carbonate, and trimethylsilylmethyl vinyl carbonate); monomethacrylated or monoacrylated polydimethylsiloxanes of various molecular weight (e.g., mono-3-methacryloxypropyl terminated, mono-butyl terminated polydimethylsiloxane or mono-(3-methacryloxy-2-hydroxypropyloxy)propyl terminated, mono-butyl terminated polydimethylsiloxane); mono-vinyl carbonate-terminated polydimethylsiloxanes; mono-vinyl carbamate-terminated polydimethylsiloxane; mono-methacrylamide-terminated polydimethylsiloxanes; mono-acrylamide-terminated polydimethylsiloxanes; carbosiloxane vinylic monomers disclosed in U.S. Pat. Nos. 7,915,323 and 8,420,711, in US Patent Application Publication Nos. 2012/244088 and 2012/245249 (herein incorporated by references in their entireties); combinations thereof.

Any suitable polysiloxane vinylic crosslinkers can be used in the invention. Examples of preferred polysiloxane vinylic crosslinkers are dimethacrylated or diacrylated polydimethylsiloxanes of various molecular weight; di-vinyl carbonate-terminated polydimethylsiloxanes; di-vinyl carbamate-terminated polydimethylsiloxane; di-methacrylamide-terminated polydimethylsiloxanes; di-acrylamide-terminated polydimethylsiloxanes; bis-3-methacryloxy-2-hydroxypropyloxypropyl polydimethylsiloxane; N,N,N',N'-tetrakis(3-methacryloxy-2-hydroxypropyl)-alpha,omega-bis-3-aminopropyl-polydimethylsiloxane;
polysiloxanylalkyl (meth)acrylic monomers; siloxane-containing macromer selected from the group consisting of Macromer A, Macromer B, Macromer C, and Macromer D described in U.S. Pat. No. 5,760,100 (herein incorporated by reference in its entirety); chain-extended polysiloxabe vinylic crosslinkers disclosed in US201008843A1 and US20120088844A1 (herein incorporated by references in their entireties); the reaction products of glycidyl methacrylate with amino-functional polydimethylsiloxanes; hydroxyl-functionalized siloxane-containing vinylic monomers or macromers; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264 (here incorporated by reference in their entireties); polysiloxane-containing macromers disclosed in U.S. Pat. Nos. 4,259,467, 4,260,725, and 4,261,875 (herein incorporated by reference in their entireties).

Any suitable hydrophilic vinylic monomers can be used in the invention. Examples of preferred vinylic monomers include without limitation N,N-dimethylacrylamide (DMA), N,N-dimethylmethacrylamide (DMMA), 2-acrylamidoglycolic acid, N-hydroxypropylacrylamide, N-hydroxyethyl acrylamide, N-[tris(hydroxymethyl)methyl]-acrylamide, N-vinyl pyrrolidone, N-vinyl formamide, N-vinyl acetamide, N-vinyl isopropylamide, N-vinyl-N-methyl acetamide, N-methyl-3-methylene-2-pyrrolidone, 1-methyl-5-methylene-2-pyrrolidone, 5-methyl-3-methylene-2-pyrrolidone, 2-hydroxyethylmethacrylate (HEMA), 2-hydroxyethyl acrylate (HEA), hydroxypropyl acrylate, hydroxypropyl methacrylate (HPMA), trimethylammonium 2-hydroxy propylmethacrylate hydrochloride, aminopropyl methacrylate hydrochloride, dimethylaminoethyl methacrylate (DMAEMA), glycerol methacrylate (GMA), a $C_1$-$C_4$-alkoxy polyethylene glycol (meth)acrylate having a number average molecular weight of up to 1500, (meth)acrylic acid, and mixtures thereof. Preferably, a polymerizable composition comprises at least about 25% by weight of one or more hydrophilic vinylic monomers listed above.

Examples of preferred hydrophobic vinylic monomers include methylacrylate, ethyl-acrylate, propylacrylate, isopropylacrylate, cyclohexylacrylate, 2-ethylhexylacrylate, methylmethacrylate, ethyl methacrylate, propylmethacrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyl toluene, vinyl ethyl ether, perfluorohexylethyl-thio-carbonyl-aminoethyl-methacrylate, isobornyl methacrylate, trifluoroethyl methacrylate, hexafluoro-isopropyl methacrylate, hexafluorobutyl methacrylate.

Examples of preferred vinylic cross-linking agents include without limitation tetraethyleneglycol diacrylate, triethyleneglycol diacrylate, diethyleneglycol diacrylate, ethyleneglycol diacrylate, tetraethyleneglycol dimethacrylate, triethyleneglycol dimethacrylate, diethyleneglycol dimethacrylate, ethyleneglycol dimethacrylate, tetraethyleneglycol divinyl ether, triethyleneglycol divinyl ether, diethyleneglycol divinyl ether, ethyleneglycol divinyl ether, trimethylopropane trimethacrylate, pentaerythritol tetramethacrylate, bisphenol A dimethacrylate, vinyl methacrylate, ethylenediamine dimethyacrylamide, ethylenediamine diacrylamide, glycerol dimethacrylate, triallyl isocyanurate, triallyl cyanurate, allylmethacrylate, allylacrylate, N-allyl-methacrylamide, N-allyl-acrylamide, 1,3-bis(methacrylamidopropyl)-1,1,3,3-tetrakis(trimethyl-siloxy)disiloxane, N,N'-methylenebisacrylamide, N,N'-methylenebismethacrylamide, N,N'-ethylenebisacrylamide, N,N'-ethylenebismethacrylamide,1,3-bis(N-methacrylamidopropyl)-1,1,3,3-tetrakis-(trimethylsiloxy)disiloxane, 1,3-bis (methacrylamidobutyl)-1,1,3,3-tetrakis(trimethylsiloxy) disiloxane, 1,3-bis(acrylamidopropyl)-1,1,3,3-tetrakis (trimethylsiloxy)-disiloxane, 1,3-bis (methacryloxyethylureidopropyl)-1,1,3,3-tetrakis (trimethylsiloxy)disiloxane, and combinations thereof. A preferred cross-linking agent is tetra(ethyleneglycol) diacrylate, tri(ethyleneglycol) diacrylate, ethyleneglycol diacrylate, di(ethyleneglycol) diacrylate, methylenebisacrylamide, triallyl isocyanurate, or triallyl cyanurate. The amount of a cross-linking agent used is expressed in the weight content with respect to the total polymer and is preferably in the range from about 0.05% to about 3% (more preferably from about 0.1% to about 2%).

Any suitable UV-absorbing vinylic monomers can be used in the invention. Examples of preferred UV-absorbing and UV/HEVL-absorbing, benzotriazole-containing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5'-methacrylamidophenyl)-5-chlorobenzotriazole, 2-(2'-hydroxy-5'-methacrylamidophenyl)-5-methoxybenzotriazole, 2-(2'-hydroxy-5'-methacryloxypropyl-3'-t-butyl-phenyl)-5-chlorobenzotriazole, 2-(2'-hydroxy-5'methylacryloxypropylphenyl)benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl) benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'-[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl- (UVAM), 2-(2'-hydroxy-5'-methacryloxyethylphenyl) benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-5-methoxy-2H-benzotriazole (UV13), 2-[2'-Hydroxy-3'-tert-butyl-5'-(3'-acryloyloxypropoxy)phenyl]-5-trifluoromethyl-2H-benzotriazole (C F$_3$-UV13), 2-(2'-hydroxy-5-methacrylamidophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS#96478-15-8), 2-(3-(tert-butyl)-4-hydroxy-5-(5-methoxy-2H-benzo[d][1,2,3]triazol-2-yl) phenoxy)ethyl methacrylate (16-102); Phenol, 2-(5-chloro-2H-benzotriazol-2-yl)-6-methoxy-4-(2-propen-1-yl) (CAS#1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (9CI) (CAS#83063-87-0). In accordance with the invention, a lens formulation comprises from about 0.2% to about 5.0%, preferably from about 0.3% to about 2.5%, more preferably from about 0.5% to about 1.8%, by weight of a UV-absorbing agent.

Examples of suitable thermal initiators include, but are not limited to, 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. Preferably, the thermal initiator is 2,2'-azobis(isobutyronitrile) (AIBN).

Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®, Germane-based Norrish Type I photoinitiators. Examples of benzoylphosphine initiators include 2,4,6-trimethylbenzoyl-diphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

Where a vinylic monomer capable of absorbing ultraviolet radiation and high energy violet light (HEVL) is used in the invention, a Germane-based Norrish Type I photoinitiator and a light source including a light in the region of about 400 to about 550 nm are preferably used to initiate a free-radical polymerization. Any Germane-based Norrish Type I photoinitiators can be used in this invention, so long as they are capable of initiating a free-radical polymerization under irradiation with a light source including a light in the region of about 400 to about 550 nm. Examples of Germane-based Norrish Type I photoinitiators are acylgermanium compounds described in U.S. Pat. No. 7,605,190 (herein incorporated by reference in its entirety). Preferably, the monomer of lens-forming materials comprises at least one of the following acylgermanium compounds.

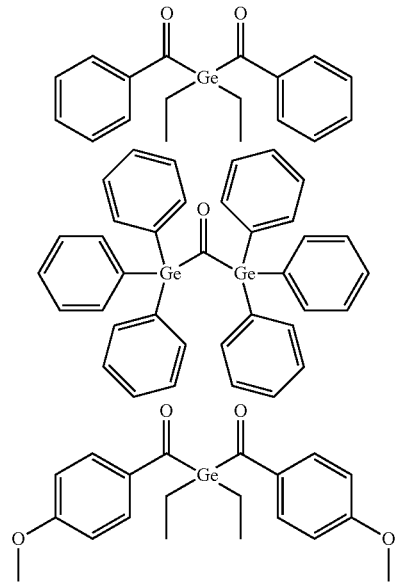

Lubricating agents can be polymerizable or non-polymerizable (i.e., leachable).

Polymerizable lubricating agents refers to any polymerizable components in a lens formulation for rendering resultant lenses wettable and lubricious. Any polymerizable lubricating agents can be used in the invention.

One class of exemplary polymerizable lubricating agents is N-vinyl type of hydrophilic vinylic monomers which have tendencies to be polymerize in the lens formulation to form, in situ, homopolymers, homopolymer chains, homopolymer segments, or combinations thereof. Those in situ formed homopolymers, homopolymer chains, and/or homopolymer segments can render resultant contact lenses wettable and optionally lubricious, as shown by examples described in U.S. Pat. Nos. 6,867,245, 7,268,198, 7,540,609, 7,572,841, 8,703,891, 8,865,789, 8,937,110, and 8,937,111, herein incorporated by references in their entireties). Examples of preferred N-vinyl type monomers include without limitation N-vinylpyrrolidone, N-vinyl formamide, N-vinyl acetamide, N-vinyl isopropylamide, N-vinyl-N-methyl acetamide, N-methyl-3-methylene-2-pyrrolidone, 1-methyl-5-methylene-2-pyrrolidone, 5-methyl-3-methylene-2-pyrrolidone, or combinations thereof (preferably N-vinylpyrrolidone, N-vinyl acetamide, N-vinyl-N-methyl acetamide, or combinations thereof).

Another class of exemplary polymerizable lubricating agents is hydrophilic polymers that comprise on sole ethylenically unsaturated group. Such polymerizable hydrophilic polymers can be incorporated into the polymer matrix of a resultant contact lens as pendant (dangling) polymer chains that can improve the wettability and optionally lubricity of the resultant contact lens. Any homopolymers or copolymers of a hydrophilic vinylic monomer described above can be used in the invention.

A further class of exemplary polymerizable lubricating agents is polysiloxane crosslinkers having pendant hydrophilic polymer chains, such as those disclosed in U.S. Pat. Nos. 8,129,442, 8,048,968, 8,404,759, 8,524,850, and 8,835,525 and in US. Pat. Appl. Pub. Nos. 2012/0088861 and 2014/01741543 (herein incorporated by references in their entireties).

Examples of leachable lubricant agents are non-polymerizable hydrophilic polymers (i.e., without ethylenically unsaturated groups) having a number average molecular weight greater than 5,000 Daltons, as shown by examples described in U.S. Pat. No. 6,367,929 (herein incorporated by reference in its entirety). Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof. The number average molecular weight $M_w$ of the non-crosslinkable hydrophilic polymer is preferably from 5,000 to 1,000,000.

Examples of leachable tear-stabilizing agents include, without limitation, phospholipids, monoglycerides, diglycerides, triglycerides, glycolipids, glyceroglycolipids, sphingolipids, sphingo-glycolipids, fatty alcohols, fatty acids, mineral oils, and mixtures thereof. Preferably, a tear stabilizing agent is a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof.

In accordance with the invention, a polymerizable composition can be a solution or a melt at a temperature from about 20° C. to about 85° C. Preferably, a polymerizable composition is a solution of all desirable components in a suitable solvent, or a mixture of suitable solvents, or a solventless liquid mixture.

A lens formulation can be prepared by dissolving all of the desirable components in any suitable solvent, such as, water, a mixture of water and one or more organic solvents miscible with water, an organic solvent, or a mixture of one or more organic solvents, as known to a person skilled in the art.

Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

Where a lens formulation is a solventless clear liquid mixture, it preferably comprises a blending vinylic monomer selected from the group consisting of a $C_1$-$C_{10}$ alkyl methacrylate, isobornylmethacrylate, isobornylacrylate, cyclopentylmethacrylate, cyclopentylacrylate, cyclohexylmethacrylate, cyclohexylacrylate, styrene, 2,4,6-trimethylstyrene (TMS), and t-butyl styrene (TBS), and combinations thereof. Preferably, the blending vinylic monomer is methylmethacrylate.

In a preferred embodiment, a lens formulation is a solution of all the desirable components dissolved in 1,2-propylene glycol, a polyethyleneglycol having a molecular weight of about 400 Daltons or less, or a mixture thereof.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711, 4,460,534, 5,843,346, and 5,894,002, which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire. Polar plastic molds can preferably be used to produce silicone hydrogel contact lenses having a much better wettability than non-polar plastic molds (e.g., polypropylene molds) (see, Lai and Friends, "Surface Wettability Enhancement of Silicone Hydrogel Lenses by Processing with Polar Plastic Molds", *J. Biomed. Mat. Res.* 35(3): 349-356 (1997); U.S. Pat. No. 5,352,714, herein incorporated by references in their entireties).

Reusable molds can also be used and the lens formulation is cured actinically under a spatial limitation of actinic radiation to form a contact lens. Examples of preferred reusable molds are those disclosed in U.S. Pat. Nos. 6,800,225, 7,384,590, and 7,387,759, which are incorporated by reference in their entireties. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

In accordance with the invention, a lens formulation can be introduced (dispensed) into a cavity formed by a mold according to any known methods.

After the lens formulation is dispensed into the mold, it is polymerized to produce a contact lens. Polymerization may be initiated thermally or actinically, preferably by exposing the lens formulation in the mold to a spatial limitation of actinic radiation to crosslink the polymerizable components in the lens formulation.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described above.

Any coating materials can be used alone or in any combinations in any manner according to any surface treatments in the invention so long as they can be used to form a lubricious coating having a target lubricity profile.

Any suitable surface treatments can be used in the invention. Examples of surface treatments include: without limitation, plasma treatments; chemical treatments; chemical vapor depositions; the graft-polymerization of hydrophilic vinylic monomers and/or macromers onto the surface (modified or unmodified) of an article; layer-by-layer ("LbL") deposition of one or more hydrophilic materials on the surface (modified or unmodified) of an article (i.e., a process for forming an LbL coating); covalently attachment of one or more hydrophilic polymeric materials onto the surface (modified or unmodified) of an article; or combinations thereof.

A plasma treatment refers to a process in which a contact lens is exposed to a plasma to chemically modify the surface of the contact lens. The term "plasma" denotes an ionized gas (e.g., created by electric glow discharge which may be composed of electrons, ions of either polarity, gas atoms and molecules in the ground or any higher state of any form of excitation, as well as of photons). The excited species interact with solid surfaces of an article placed in the plasma, resulting in the chemical and physical modification of the material surface. Where a plasma is generated by subjecting a gas in a vacuum chamber to an electric charge typically at radio frequency (rf) (or at a microwave or other frequency), it is often called "low temperature plasma". Where a plasma is generated by an atmospheric discharge (e.g., arc discharge) and sustained at a surrounding atmospheric pressure, it is a "high temperature plasma" or "atmospheric plasma". An atmospheric plasma can be produced by atmospheric pressure discharges.

For a review of plasma treatment and its uses reference is made to R. Hartmann "Plasma polymerisation: Grundlagen, Technik and Anwendung, Jahrb. Oberflächentechnik (1993) 49, pp. 283-296, Battelle-Inst. e.V. Frankfurt/Main Germany; H. Yasuda, "Glow Discharge Polymerization", Journal of Polymer Science: Macromolecular Reviews, vol. 16 (1981), pp. 199-293; H. Yasuda, "Plasma Polymerization", Academic Press, Inc. (1985); Frank Jansen, "Plasma Deposition Processes", in "Plasma Deposited Thin Films", ed. by T. Mort and F. Jansen, CRC Press Boca Raton (19); O. Auciello et al. (ed.) "Plasma-Surface Interactions and Processing of Materials" publ. by Kluwer Academic Publishers in NATO ASI Series; Series E: Applied Sciences, vol. 176 (1990), pp. 377-399; and N. Dilsiz and G. Akovali "Plasma Polymerization of Selected Organic Compounds", Polymer, vol. 37 (1996) pp. 333-341.

The known plasma treatment under low pressure includes plasma deposition, plasma-induced polymerization, plasma grafting, plasma oxidation, and the likes. Plasma treatment under low pressure haven been used in commercial products, for example, such as, Focus NIGHT & DAY® and AIRPTIX® (Alcon), and PUREVISION® (Bausch & Lomb). Advantages of a plasma coating, such as, e.g., those may be found with Focus NIGHT & DAY®, are its durability, relatively high hydrophilicity/wettability), and low susceptibility to lipid and protein deposition and adsorption. Examples of plasma treatment are those disclosed in U.S. Pat. Nos. 4,143,949; 4,312,575; 5,464,667, 6,881,269; and 7,078,074 (herein incorporated by references in their entireties). It is understood that a preformed contact lenses must typically be dried before a plasma treatment under low pressure.

A person skilled in the art understand well that a plasma (i.e., electrical glow discharge plasma) is a partially ionized gas which consists of large concentrations of excited atomic, molecular, ionic, and free-radical species and which is generated subjecting a gas in a vacuum chamber to an electric field, typically at radio frequency (rf) (or at a microwave or other frequency).

As an illustrated example of plasma treatment under low pressure of silicone hydrogel contact lenses, one or more preformed silicone hydrogel contact lenses are placed in a reactor chamber between opposing electrodes. The chamber is then sealed and depressurized by a vacuum system. Significant time is required to pump the system to the operative pressure. When a suitable pressure is achieved in the chamber, a process gas is introduced into the chamber interior, and the electrodes are energized. The resulting plasma cloud may apply a thin layer of polymer (or a polymer coating) to the lens and/or change the chemical composition of a top layer of the lens surface depending upon the process gas used. After an appropriate time, the electrodes are de-energized, and the reactor chamber is brought back to atmospheric pressure so that the lenses may be removed.

Low pressure plasma treatment systems are known to a person skilled in the art and have been disclosed in patents and articles. For example, Peng Ho and Yasuda describe, in their paper ("Ultrathin Coating Of Plasma Polymer Of Methane Applied On The Surface Of Silicone Contact Lenses," Journal of Biomedical Materials Research, Vol. 22, 919-937 (1988), herein incorporated by reference in its entirety), a batch low-pressure-plasma treatment system (or a rotary plasma system) including a bell-shaped vacuum chamber in which opposing aluminum electrodes are disposed and a rotatable aluminum plate sits between the electrodes and is driven by an induction motor within the system. Matsuzawa and Winterton disclose in U.S. Pat. No. 6,881,269 (herein incorporated by reference in its entirety) a linear low-pressure-plasma system.

In accordance with the invention, the preformed contact lens in a dried state is treated with a low-pressure plasma generated in a plasma gas (i.e., an atmosphere) compose of air, $N_2$, $O_2$, $CO_2$, or a mixture of a $C_1$-$C_6$ hydrocarbon and a secondary gas selected from the group consisting of air, $N_2$, $O_2$, $CO_2$, and combinations thereof (preferably $CO_2$ or a mixture of a $C_1$-$C_4$ hydrocarbon and a secondary gas selected from the group consisting of air, $CO_2$, $N_2$, and combinations thereof, more preferably $CO_2$ or a mixture of methane and a secondary gas selected from the group consisting of air, $CO_2$, $N_2$, and combinations thereof, even more preferably $CO_2$ or a mixture of methane and $CO_2$).

Atmospheric plasma surface treatment disclosed in U.S. Pat. No. 9,156,213 (herein incorporated by reference in its entirety) is preferably used in the invention. For the atmospheric plasma surface treatment, contact lenses can be in a fully hydrated state.

Although plasma surface treatment can render a silicone hydrogel contact lens wettable, it is unlikely to provide a good lubricity and surface hydrophilicity (as measured by water-break-up-time, WBUT). It would be desirable that a plasma coating is used as a prime coating for further surface modifications, such as, deposing one or more layers of one or more hydrophilic polymers (i.e., LbL coating), covalently attaching a layer of one or more hydrophilic polymers, graft-polymerization of one or more hydrophilic vinylic monomers and/or macromers on the surface of a contact lens, or combinations thereof, to obtain a lubricious surface.

"LbL coating", as used herein, refers to a coating that is not covalently attached to the polymer matrix of a contact lens and is obtained through a layer-by-layer ("LbL") deposition of one or more hydrophilic materials on the lens. An LbL coating can be composed of one or more layers. LbL coatings on contact lenses can be obtained according to methods described in U.S. Pat. Nos. 6,451,871, 6,719,929, 6,793,973, 6,811,805, 6,896,926, 8,044,112, 8,158,192, and 8,147,897 (herein incorporated by references in their entireties). Preferably, an LbL coating comprises at least one layer of one or more polyanionic polymers each comprising carboxyl groups. The polyanionic polymer is preferably a polyanionic polymer selected from the group consisting of polyacrylic acid, polymethacrylic acid, polyethylacrylic acid, poly(acrylic acid-co-methacrylic acid), poly(acrylic acid-co-ethacrylic acid), poly(methacrylic acid-co-ethacrylic acid), and a mixture thereof, more preferably a polyanionic polymer which is polyacrylic acid, polymethacrylic acid, poly(acrylic acid-co-methacrylic acid), or a mixture thereof.

An LbL coating of a polyanionic polymer having carboxyl groups can be form on a contact lens by contacting the contact lens with a solution of the polymer. Contacting of a contact lens with a coating solution of a polymer can occur by dipping it into the coating solution or by spraying it with the coating solution. One contacting process involves solely dipping the contact lens in a bath of a coating solution for a period of time or alternatively dipping the contact lens sequentially in a series of bath of coating solutions for a fixed shorter time period for each bath. Another contacting process involves solely spray a coating solution. However, a number of alternatives involve various combinations of spraying- and dipping-steps may be designed by a person having ordinary skill in the art. The contacting time of a contact lens with a coating solution of a reactive polymer may last up to about 10 minutes, preferably from about 5 to about 360 seconds, more preferably from about 5 to about 250 seconds, even more preferably from about 5 to about 200 seconds.

A solution of a polyanionic polymer for forming a coating on contact lenses can be prepared by dissolving one or more polymers in water, a mixture of water and an organic solvent miscible with water, an organic solvent, or a mixture of one or more organic solvent. Preferably, the polymer is dissolved in a mixture of water and one or more organic solvents, an organic solvent, or a mixture of one or more organic solvent. It is believed that a solvent system containing at least one organic solvent can swell a contact lens so that a portion of the reactive polymer may penetrate into the contact lens and increase the durability of the coating. Examples of organic solvents are described above. The pH of the polyanionic polymer solution is preferably from about 1.5 to about 4.0 to form a relatively-thick and stable LbL coating. The temperature of the coating solution is preferably from about 20° C. to about 70° C.

A person skilled in the art knows how to covalently attach one or more hydrophilic polymers onto the surface of a contact lens. Exemplary methods for covalently attaching one or more hydrophilic polymers onto a medical device are disclosed in U.S. Pat. Nos. 5,599,576, 5,766,158, 6,087,415, 6,096,726, 6,340,465, 6,440,571, 6,500,481, 6,534,559, 6,623,747, 6,683,062, 6,838,491, 6,866,936, 6,923,978, and 8,529,057 (herein incorporated by references in their entireties) and in U.S. Pat. Appl. Pub. Nos. 2009-0145086A1, 2009-0145091A1, 2008-0142038A1, and 2007-0122540A1 (herein incorporated by references in their entireties).

Graft-polymerization of one more hydrophilic vinylic monomers (any one selected from the list of hydrophilic vinylic monomers described above, preferably one or more hydrophilic vinylic monomers selected from the group consisting of acrylamide, N,N-dimethylacrylamide (DMA), N,N-dimethylmethacrylamide (DMMA), 2-acrylamidoglycolic acid, N-hydroxypropylacrylamide, N-hydroxyethyl acrylamide, N-[tris(hydroxymethyl)methyl]-acrylamide, N-vinylpyrrolidone, N-vinyl formamide, N-vinyl acetamide, N-vinyl isopropylamide, N-vinyl-N-methyl acetamide, N-methyl-3-methylene-2-pyrrolidone, 1-methyl-5-methylene-2-pyrrolidone, 5-methyl-3-methylene-2-pyrrolidone, 2-hydroxyethyl methacrylate (HEMA), 2-hydroxyethyl acrylate (HEA), trimethylammonium 2-hydroxy propylmethacrylate hydrochloride, aminopropyl methacrylate hydrochloride, dimethylaminoethyl methacrylate (DMAEMA), glycerol methacrylate (GMA), a $C_1$-$C_4$-alkoxy polyethylene glycol (meth)acrylate having a number average molecular weight of up to 1500, (meth)acrylic acid, and mixtures thereof) in the presence or absence of a hydrophilic crosslinking agent (preferably selected from the group consisting of tetraethyleneglycol diacrylate, triethyleneglycol diacrylate, diethyleneglycol diacrylate, ethyleneglycol diacrylate, tetraethyleneglycol dimethacrylate, triethyleneglycol dimethacrylate, diethyleneglycol dimethacrylate, ethyleneglycol dimethacrylate, tetraethyleneglycol divinyl ether, triethyleneglycol divinyl ether, diethyleneglycol divinyl ether, ethyleneglycol divinyl ether, ethylenediamine dimethyacrylamide, ethylenediamine diacrylamide, glycerol dimethacrylate, triallyl isocyanurate, triallyl cyanurate, N-allyl-methacrylamide, N-allyl-acrylamide, N,N'-methylenebisacrylamide, N,N'-methylenebismethacrylamide, N,N'-ethylenebisacrylamide, N,N'-ethylenebismethacrylamide, and combinations thereof) to form a hydrophilic polymer coating are described in numerous patents, for example, in U.S. Pat. Nos. 6,099,122, 6,436,481, 6,440,571, 6,447,920, 6,465,056, 6,521,352, 6,586,038, 6,730,366, 6,734,321, 6,835,410, and 6,878,399 (all of which are herein incorporated by reference in their entireties) and in JP2001075060 (herein incorporated by reference in its entirety).

It should be understood that two or more surface treatments can be combined to obtain a desirably lubricious coating on a contact lens.

In a preferred embodiment, a desirably lubricious coating comprises a reactive base coating having reactive functional groups and a hydrogel coating on top of the reactive base coating. The reactive base coating can be formed by using one or more surface treatments. For example, a reactive base coating can be: an LbL coating, a plasma coating, combination of a plasma coating and an LbL coating thereon; a layer of one or more hydrophilic polymers obtained by covalently attachment or graft polymerization; combination of a layer of one or more hydrophilic polymers and an LbL coating thereon; or combination of plasma coating, a layer of one more hydrophilic polymers on top of the plasma coating, and an LbL coating on top of the layer of one or more hydrophilic polymers. The hydrogel top coating is preferably obtained by heating a contact lens with a reactive base coating thereon in a solution comprising a water-soluble and thermally-crosslinkable hydrophilic polymeric material having azetidinium groups and optionally (but preferably) thiol, amino or carboxyl groups, at a temperature of from about 60° C. to about 140° C. for a time period sufficient long to crosslink the water-soluble thermally-crosslinkable hydrophilic polymeric material and the base coating so as to form a hydrogel coating on the contact lens. A water-soluble and thermally-crosslinkable hydrophilic polymeric material is preferably a poly(2-oxazoline-co-ethyleneimine)-epichlorohydrin, a chemically-modified poly(2-oxazoline-co-ethyleneimine)-epichlorohydrin, a chemically-modified polyamidoamine-epichlorohydrin, or combinations thereof, wherein the chemically-modified poly(2-oxazoline-co-ethyleneimine)-epichlorohydrin or the chemically-modified polyamidoamine-epichlorohydrin comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains. Various hydrophilicity-enhancing agents are described in detail in U.S. Pat. No. 8,529,057 (herein incorporated by reference in its entirety) and can be used in this invention.

A person skilled in the art knows how to select a surface treatment or a combination of two or more surface treatments, coating materials and coating conditions under which the selected coating materials can be applied onto a contact lens according to the selected surface treatment or the selected combination of the two or more surface treatments to obtain a coated contact lens. The selected coating materials must be capable of being applied onto a contact lens (preferably hydrogel contact lens, more preferably silicone hydrogel contact lens) under the selected coating conditions according to the selected surface treatment or the selected combination of the two or more surface treatments to obtain a coated contact lens having a first target lubricity profile (i.e., a velocity-weighted average coefficient of friction, $\overline{CoF_v}$ as determined according to the procedures described in Example 1). Preferably, design of experiments (DOE) is used in the selection process.

For example, where an LbL coating process is selected to form a lubricious coating on a contact lens, at least one linear or branched polyanionic polymer having a desired number average molecular weight can be selected from the preferred list of polyanionic polymers described above or from the like materials, conditions to be selected include without limitation the concentration of the selected polyanionic polymer, a solvent (water, an organic solvent, a mixture of water and at least one organic solvent, or a mixture of two or more organic solvents, etc.), pH of the coating solution, coating temperature, the ionic strength of the coating solution, coating duration (from several second to several hours), dip-coating or spray-coating or combinations thereof, or combinations thereof. It is understood that the selected polyanionic polymer must be form, under the selected coating conditions, a lubricious coating on a contact lens which must have a first target lubricity profile.

Where a thermally-crosslinked coating process is selected to form a hydrophilic, crosslinked coating on top of a reactive LbL base coating, one can select a water-soluble thermally crosslinkable material and thermal crosslinking conditions under which a lubricious coating is formed on top the reactive LbL base coating. It is understood that the selected water-soluble, thermally-crosslinkable material must be form, under the selected coating conditions, a lubricious coating on a contact lens which must have a first target lubricity profile.

Where a reactive base coating is a plasma coating and the top coating is a crosslinked coating of a water-soluble thermally-crosslinkable material, one can select plasma coating material, a water-soluble thermally crosslinkable material, plasma coating conditions, and thermal crosslinking conditions, the combination of the selected coating materials and the coatings conditions should result in formation of a lubricious coating on a contact lens which must have a first target lubricity profile.

Where a reactive base coating is composed of a plasma coating and an LbL coating thereon and the top coating is a crosslinked coating of a water-soluble thermally-crosslinkable material, one can select plasma coating material, a polyanionic polymer, a water-soluble thermally crosslinkable material, plasma coating conditions, LbL coating conditions, and thermal crosslinking conditions, the combination of the selected coating materials and the coatings conditions should result in formation of a lubricious coating on a contact lens which must have a first target lubricity profile.

Where graft-polymerization coating process is selected to form a lubricious coating on a contact lens, one or more hydrophilic vinylic monomers and one or more hydrophilic vinylic crosslinking agents can be selected from the preferred lists of hydrophilic vinylic monomer and hydrophilic vinylic crosslinking agents described above, conditions to be selected include without limitation the concentrations of the selected hydrophilic vinylic monomers and the selected hydrophilic vinylic crosslinking agents, a solvent (water, an organic solvent, a mixture of water and at least one organic solvent, a radical initiator (e.g., an oxidizing or reducing agent, a thermal initiator, a photoinitiator, a reversible addition-fragmentation chain-transfer (RAFT) polymerization initiator, an atom-transfer radical-polymerization (ATRP) initiator, or combinations thereof) and the concentration thereof, a solvent, temperature, graft-polymerization duration (from several second to several hours), or combinations thereof. It is understood that the selected coating materials must be form, under the selected coating conditions, a lubricious coating on a contact lens which must have a first target lubricity profile.

Where a reactive base coating is a coating obtained according to graft-polymerization and the top coating is a crosslinked coating of a water-soluble thermally-crosslinkable material, one can select coating materials for graft-polymerization, a water-soluble thermally crosslinkable material, graft-polymerization conditions, and thermal crosslinking conditions, the combination of the selected coating materials and the coatings conditions should result in formation of a lubricious coating on a contact lens which must have a first target lubricity profile.

Where a reactive base coating is composed of a plasma coating and a coating of graft-polymerization thereon and the top coating is a crosslinked coating of a water-soluble thermally-crosslinkable material, one can select plasma coating material, graft-polymerization materials, a a water-soluble thermally crosslinkable material, plasma coating conditions, graft-polymerization coating conditions, and thermal crosslinking conditions, the combination of the selected coating materials and the coatings conditions should result in formation of a lubricious coating on a contact lens which must have a first target lubricity profile.

It is understood that any combinations of known surface treatments can be used in the invention.

A person skilled in the art knows how to select a lens formulation (preferably a hydrogel lens formulation, more preferably a silicone hydrogel lens formulation) which is cured in the selected mold under the selected curing conditions to form a contact lens (preferably a hydrogel contact lens, more preferably a silicone hydrogel contact lens) having a second target lubricity profile (i.e., a velocity-weighted average coefficient of friction, $\overline{CoF_v}$ as determined according to the procedures described in Example 1). Preferably, design of experiments (DOE) is used in the selection process. The selected lens formulation must be capable of being cured in the selected mold under the selected curing conditions to obtain a contact lens having a second target lubricity profile (i.e., a velocity-weighted average coefficient of friction, $\overline{CoF_v}$ as determined according to the procedures described in Example 1). Preferably, design of experiments (DOE) is used in the selection process.

For example, one can select a mold (made of a particular mold material, e.g., polar mold or non-polar mold); a lens formulation comprising one or more silicone-containing vinylic monomers and/or macromers, a hydrophilic vinylic monomer, at least one lubricating agent (e.g., a polymerizable lubricating agent, anon-polymerizable lubricating agent, or combination thereof), at least one crosslinking agent, and optionally a solvent; the concentrations of the lubricating agent; the curing method (thermal or photo curing); the curing time. The combination of the selected mold, the selected lens formulation, and the selected curing conditions must produce a contact lens having a second target lubricity profile.

A person skilled in the art knows how to introduce and cure a lens formulation in a lens mold to form a contact lens.

It is understood that in procedure (1) the preformed contact lens can be lubricious and have a second target lubricity profile before applying a lubricious coating thereon.

In another aspect, the invention provides a method of manufacturing contact lenses (preferably hydrogel contact lenses, more preferably silicone hydrogel contact lenses, comprising the step of: inspecting manufactured contact lenses for having a target lubricity profile as characterized by having a velocity-weighted average coefficient of friction, $\overline{CoF_v}$, of about $450\times10^{-3}$ or less (preferably about $400\times10^{-3}$ or less, more preferably about $350\times10^{-3}$ or less, even more preferably about $250\times10^{-3}$ or less); and discarding those contact lenses which do not have the target lubricity. Preferably, the inspecting step is conducted by statistical sampling or conducted continuously on production line.

In general, manufactured contact lenses need to be inspected for defects, e.g., physical defects, and optic defects. In accordance with the invention, the inspection of defects can include also determining whether those manufactured contact lenses can also meet the criteria for having a target lubricity profile. Those lenses found to meet the criteria proceed to packaging for further processing and for commercial use; those lenses that do not are discarded.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A method for producing contact lenses according to procedure (I) or (II), wherein procedure (I) comprises the steps of: (a) obtaining preformed contact lenses; (b)

selecting a surface treatment or a combination of two or more surface treatments, coating materials, and coating conditions under which the selected coating materials can be applied onto a contact lens according to the selected surface treatment or the selected combination of the two or more surface treatments to obtain a coated contact lens having a first target lubricity profile as characterized by having a first velocity-weighted average coefficient of friction, $\overline{CoF_v}$, of about $450 \times 10^{-3}$ or less; and (c) applying the selected coating materials onto the preformed contact lenses under the selected coating conditions to form the contact lenses each having the first target lubricity profile, wherein procedure (II) comprises the steps of: (a) selecting a mold material for making lens molds; (b) selecting a lens formulation and curing conditions under which the selected lens formulation can be cured in the selected mold under the selected curing conditions to form a contact lens having a second target lubricity profile as characterized by having a second velocity-weighted average coefficient of friction, $\overline{CoF_v}$, of about $450 \times 10^{-3}$ or less, wherein the lens formulation comprises at least one lubricating agent for imparting the second target lubricity profile to the formed contact lens; and (c) introducing and curing the selected lens formulation in the lens molds to form the contact lenses each having the second target lubricity profile.

2. The method according to invention 1, wherein the contact lenses are hydrogel contact lenses, preferably silicone hydrogel contact lenses.

3. The method according to invention 1 or 2, wherein the first and second velocity-weighted average coefficients of friction independent of each other are about $400 \times 10^{-3}$ or less.

4. The method according to invention 1 or 2, wherein the first and second velocity-weighted average coefficients of friction independent of each other are about $350 \times 10^{-3}$ or less.

5. The method according to invention 1 or 2, wherein the first and second velocity-weighted average coefficients of friction independent of each other are about $250 \times 10^{-3}$ or less.

6. The method according to any one of inventions 1 to 5, wherein the contact lens is produced according procedure (I).

7. The method according to invention 6, wherein the preformed contact lenses are non-silicone hydrogel contact lenses.

8. The method according to invention 6, wherein the preformed contact lenses are silicone hydrogel contact lenses.

9. The method according to any one of inventions 6 to 8, wherein the selected surface treatment of the selected combination of the two or more surface treatments comprises a plasma treatment, a graft-polymerization of one or more hydrophilic vinylic monomers and/or macromers, a layer-by-layer deposition of one or more first hydrophilic polymeric materials, covalently attachment of one or more second hydrophilic polymeric materials, or a combination thereof.

10. The method according to invention 9, wherein the plasma treatment is carried out under low pressure and is a process of plasma-induced polymerization, a plasma grafting, plasma oxidation, or combination thereof.

11. The method according to invention 9, wherein the plasma treatment is carried out at a surrounding atmospheric pressure.

12. The method according to invention 9, wherein the one or more first hydrophilic polymeric materials comprise at least one polyanionic material selected from the group consisting of polyacrylic acid, polymethacrylic acid, polyethylacrylic acid, poly(acrylic acid-co-methacrylic acid), poly(acrylic acid-co-ethacrylic acid), poly(methacrylic acid-co-ethacrylic acid), and a mixture thereof, more preferably a polyanionic polymer selected from the group consisting of polyacrylic acid, polymethacrylic acid, poly(acrylic acid-co-methacrylic acid), and a mixture thereof.

13. The method according to invention 9, wherein the graft-polymerization is carried out with one or more hydrophilic vinylic monomers selected from the group consisting of acrylamide, N,N-dimethylacrylamide (DMA), N,N-dimethylmethacrylamide (DMMA), 2-acrylamidoglycolic acid, N-hydroxypropylacrylamide, N-hydroxyethyl acrylamide, N-[tris(hydroxymethyl)methyl]-acrylamide, N-vinylpyrrolidone, N-vinyl formamide, N-vinyl acetamide, N-vinyl isopropylamide, N-vinyl-N-methyl acetamide, N-methyl-3-methylene-2-pyrrolidone, 1-methyl-5-methylene-2-pyrrolidone, 5-methyl-3-methylene-2-pyrrolidone, 2-hydroxyethylmethacrylate (HEMA), 2-hydroxyethyl acrylate (HEA), trimethylammonium 2-hydroxy propylmethacrylate hydrochloride, aminopropyl methacrylate hydrochloride, dimethylaminoethyl methacrylate (DMAEMA), glycerol methacrylate (GMA), a $C_1$-$C_4$-alkoxy polyethylene glycol (meth) acrylate having a number average molecular weight of up to 1500, (meth)acrylic acid, and mixtures thereof) in the presence or absence of a hydrophilic crosslinking agent (preferably selected from the group consisting of tetraethyleneglycol diacrylate, triethyleneglycol diacrylate, diethyleneglycol diacrylate, ethyleneglycol diacrylate, tetraethyleneglycol dimethacrylate, triethyleneglycol dimethacrylate, diethyleneglycol dimethacrylate, ethyleneglycol dimethacrylate, tetraethyleneglycol divinyl ether, triethyleneglycol divinyl ether, diethyleneglycol divinyl ether, ethyleneglycol divinyl ether, ethylenediamine dimethyacrylamide, ethylenediamine diacrylamide, glycerol dimethacrylate, triallyl isocyanurate, triallyl cyanurate, N-allyl-methacrylamide, N-allyl-acrylamide, N,N'-methylenebisacrylamide, N,N'-methylenebismethacrylamide, N,N'-ethylenebisacrylamide, N,N'-ethylenebismethacrylamide, and combinations thereof).

14. The method according to any one of inventions 9 to 13, wherein the coating of each contact lenses comprises a reactive base coating reactive functional groups and a hydrogel coating on top of the reactive base coating, wherein the reactive base coating is: an LbL coating, a plasma coating, combination of a plasma coating and an LbL coating thereon; a layer of one or more hydrophilic polymers obtained by covalently attachment or graft polymerization; combination of a layer of one or more hydrophilic polymers and an LbL coating thereon; or combination of plasma coating, a layer of one more hydrophilic polymers on top of the plasma coating, and an LbL coating on top of the layer of one or more hydrophilic polymers.

15. The method according to invention 14, wherein the hydrogel top coating is obtained by heating a contact lens with a reactive base coating thereon in a solution comprising a water-soluble and thermally-crosslinkable hydrophilic polymeric material at a temperature of from about 60° C. to about 140° C. for a time period sufficient long to crosslink the water-soluble thermally-crosslinkable hydrophilic polymeric material and the base coating so as to form a hydrogel coating on the contact lens.

16. The method according to invention 15, wherein the water-soluble and thermally-crosslinkable hydrophilic polymeric material is a poly(2-oxazoline-co-ethyleneimine)-epichlorohydrin, a chemically-modified poly(2-oxazoline-co-ethyleneimine)-epichlorohydrin, a chemically-modified polyamidoamine-epichlorohydrin, or combinations thereof, wherein the chemically-modified poly(2-oxazoline-co-ethyleneimine)-epichlorohydrin or the chemically-modified polyamidoamine-epichlorohydrin comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains.

17. The method according to any one of inventions 9 to 16, wherein the preformed contact lenses have a second target lubricity profile before being subjected to any surface treatment, provided that the first velocity-weighted average coefficient of friction is smaller than the second velocity-weighted average coefficient of friction.

18. The method according to any one of inventions 1 to 8, wherein the contact lens is produced according procedure (II).

19. The method according to invention 18, wherein the lens formulation comprises at least one N-vinyl type vinylic monomer.

20. The method according to invention 19, wherein the N-vinyl type vinylic monomer is N-vinylpyrrolidone, N-vinyl acetamide, N-vinyl-N-methyl acetamide, or combinations thereof.

21. The method according to invention 18, wherein the lens formulation comprises at least one non-crosslinkable hydrophilic polymer having a number average molecular weight $M_w$ of from 5,000 to 1,000,000 Daltons.

22. A method of manufacturing contact lenses, comprising the step of: inspecting manufactured contact lenses for having a target lubricity profile as characterized by having a velocity-weighted average coefficient of friction, $\overline{CoF_v}$, of about $450\times10^{-3}$ or less (preferably about $400\times10^{-3}$ or less, more preferably about $350\times10^{-3}$ or less, even more preferably about $250\times10^{-3}$ or less); and discarding those contact lenses which do not have the target lubricity.

23. The method according to invention 22, wherein the contact lenses are hydrogel contact lenses, more preferably silicone hydrogel contact lenses.

24. The method according to invention 22 or 23, wherein the inspecting step is conducted by statistical sampling or conducted continuously on production line.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

EXAMPLE 1

System and Method for Testing Lubricity

A system and a method of the invention for measuring CoF, the degree of interaction between a contact lens surface and a counter-surface in the presence of a lubricant under a variety of conditions, using a testing system illustrated schematically in FIG. 1. The testing system comprises: a standard substrate 110 which functions as the counter surface to the contact lens 101 under testing and is held firmly and submerged in a lubricant 105 in a depression 141 of a substrate support 140; a lens mounting device 120 which holds the contact lens 101 and is linked respectively to springs 123 and to a tangential force sensing load cell 125 via zero stretch lines 121 and 122; two normal force sensing load cells 134 and 135 rest upon which the substrate support 140 rests; a stepper motor driven linear slide 180 that supports the two normal force sensing load cells 134 and 135; and a frame (not shown), above the stepper motor driven linear slide 180, for supporting and suspending the load cell 125 and the lens mounting device 120.

Figure 2:
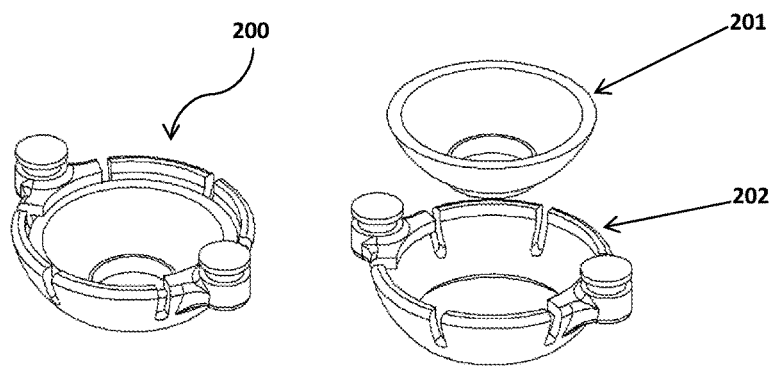
FIG. 2 schematically illustrates a preferred lens mounting device used in the testing system shown in FIG. 1.

The lens mounting device 120 is preferably an assembly 200 designed to clamp the contact lens in a relaxed, natural state, as illustrated schematically in FIG. 2. The base 201, which supports the base curve of the contact lens, can be designed to control the geometry of the lens surface presented to the counter-surface. The clamping feature 202 is designed with an aperture that does not restrict the lens surface contact. The clamping force ideally is great enough to resist any adhesive forces between the lens and the counter surface so that the adhesive forces can be measured. The lens mounting device can be prepared by injection molding or 3-D printing, as known to a person skilled in the art.

The lens mounting device 120 with contact lens 101 clamped therein is suspended between the load cell 125 and the springs through light, stiff (zero stretch) wires which are preferably arranged in a triangle to define a plane but to ensure that the attachment of the lens mounting device 120 to the load cell 125 is achieved along a line.

Standard (75 mm×50 mm) microscope slides in borosilicate glass can be used as standard substrates as counter-surfaces. There several advantages for using standard microscope slides as counter surfaces. First, the variation among slides can be insignificant so that they are disposable standard substrates for routine testing. Second, their geometry permits reasonable path lengths. Third, there is a variety of surface chemistries available from borosilicate glass to spin-coated polymer surfaces. Additional hydrogels or other polymer systems can be cast onto the slide where the slide acts as a support for the hydrogel. Examples of preferred microscope slides include NEXTERION® Slide B which is a highly chemically resistant borosilicate glass having a "fire-polished" upper surface and a water contact angle (sessile drop) of 21±2 (n=4) and NEXTERION® Slide E which has an epoxysilane coated borosilicate glass surface and a water contact angle (sessile drop) of 50±2 (n=4), both from SCHOT Technical Glass Solutions GmbH (Germany). Slide-B and Slide-E are in the range of wettability observed rabbit cornea that have been washed Acetyl Cystein (Tiifany, ACTA Ophthalmologyca, 68: 182-187 (1990), herein incorporated by reference in its entirety). In the examples below, NEXTERION® Slide B is used as standard substrate (i.e., counter surface), one new (unused) slide is used for testing one contact lens.

Water (de-ionized or distilled), phosphate-buffered saline (pH 6.8-7.6), borate-buffered saline, or an artificial tear fluid can be used as lubricant. Preferably, a phosphate-buffered saline (pH ≈7.2) is used as lubricant. The volume of the lubricant is large enough for just covering the counter surface but not too large to have the lubricant surface level that is about 2.0 mm or less above the counter surface. In the examples below, a phosphate-buffered saline (pH ≈7.2) is used as lubricant.

The variation of sliding velocity can be achieved by the Discrete sliding velocity approach where there is rapid acceleration from rest to a steady-state speed followed by rapid deceleration to rest prior to changing direction. This is repeated for a series of steady-state sliding velocities to produce a response curve. The choice of sliding velocities will determine the weighting of the resulting response curve. A second method to vary sliding velocity is to apply an acceleration from rest that results in a peak velocity at a midpoint of travel where the system then decelerates to rest prior to changing direction.

The response curve can be plotted as the CoF (i.e., FT/FN) verses sliding velocity, the CoF versus the log of sliding velocity (semi-log) or the log of the CoF verses log of sliding velocity (log-log). The log-log plot is the plot most often associated with the Stribeck Lubrication Model. The choice of axes provides the weighting of the response and various weightings can be used to explore mechanisms involved in the surface-lubricant-surface systems.

Any linear motion slides can be used in the invention. Preferably, a stepper motor driven linear slide is used in the invention. In the examples below, Parker Daedal Model 402006LNMS-D2L2C2M1 linear slide is driven by Parker Compumotor Zeta57-51 stepper motor Parker Compumotor Zeta DRIVE ZETR4 motor drive under the control of National Instruments PCI-7344 motion control to have reciprocating motions, thereby generating reciprocating sliding motion of the contact lens relative to the counter surface. The acceleration and velocity of the sliding, the dwell time between changes in direction, and the distance of travel along the counter surface are also controlled by a computer.

In the examples below, the counter-surface is moved while in contact with the lens surface using a reciprocating motion over a path length of 50 mm according to the velocity profile (VP) study in which sliding velocity is varied systematically with an instrument setting of constant acceleration to a maximum value then decelerates to the turnaround. The sliding velocity is calculated from the instrument recorded time and reported position from the stepper motor. It is noted that that the initial and final 10% of the paths are non-ideal due to the limitations in the used particular stepper-drive system. Such an approach generates a velocity profile that is conceptually similar to the fact that an eyelid's movement over the cornea (i.e., the travel of the eyelid across the cornea during the eyelids' blink) also follows a velocity profile. The velocity profile yields a response as a function of sliding velocity and all the CoF verses sliding velocity data is obtained in a single experimental run. This approach permits the acquisition of response to a wide range of sliding velocities in a single cycle. Multiple cycles (e.g., 10 cycles) serve to improve the statistics with increased number of data.

Figure 3A:
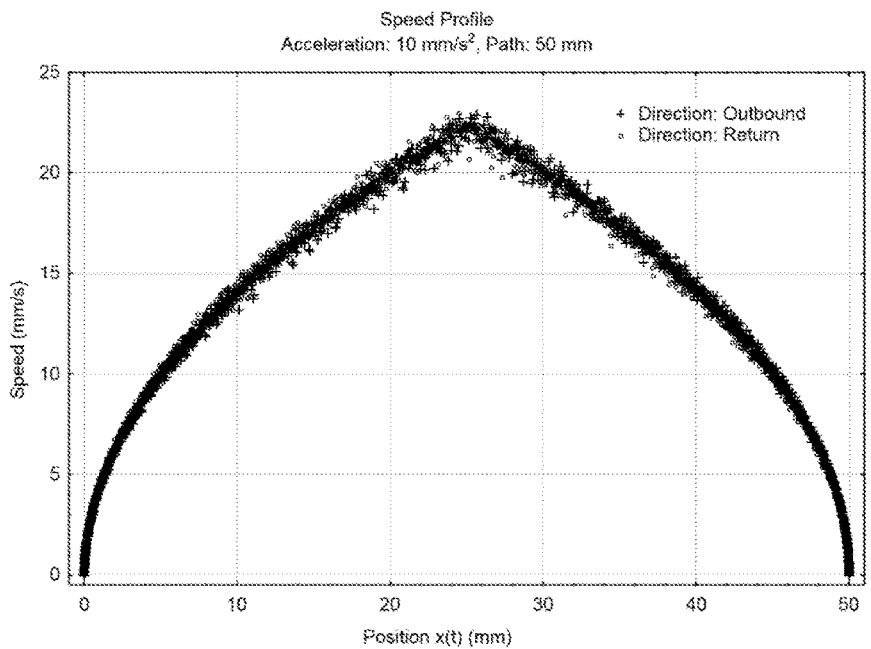
FIGS. 3A and 3B illustrate an example of a velocity profile study.
Figure 3B:
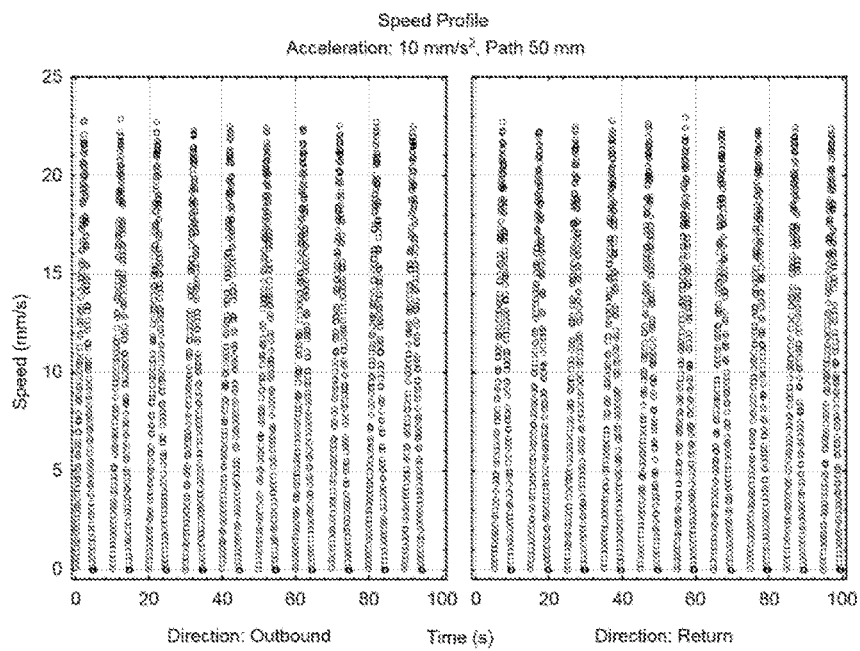
Figure 4A:
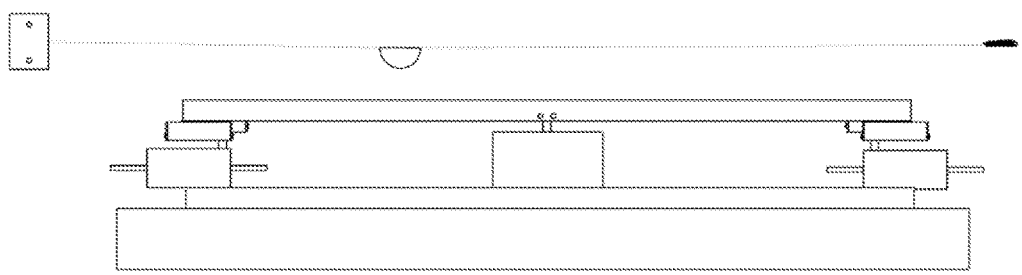
FIG. 4 illustrates schematically the setup of a preferred testing system for measuring the CoF of a contact lens. A: side view; B: top view; C: end views.
Figure 4B:
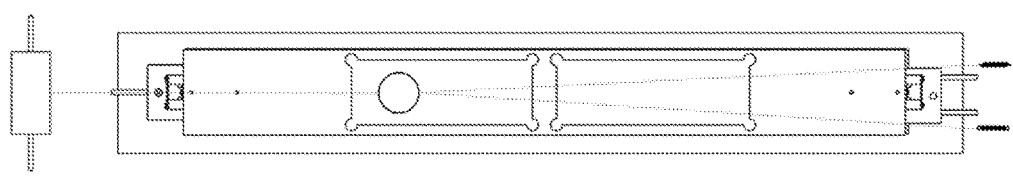
Figure 4C:
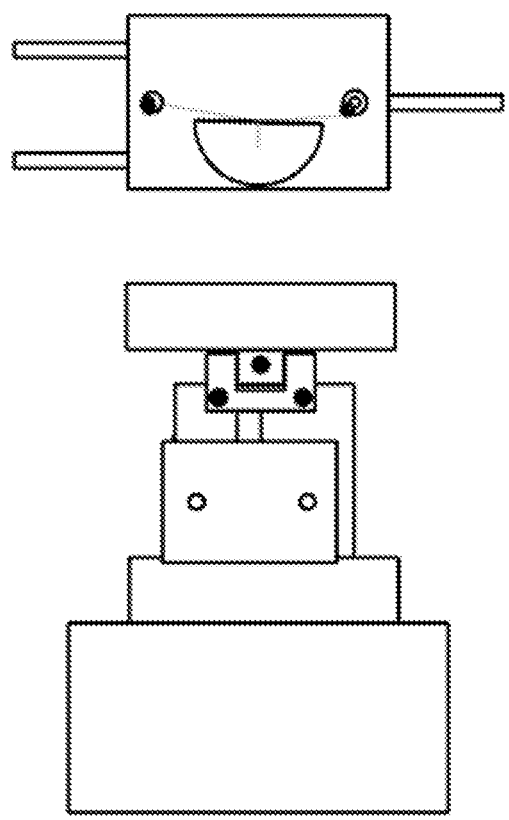

FIG. 3 illustrates an example of a velocity profile study which is also used in collecting date for the examples below. In this illustrative example, the standard substrate (NEXTERION® Slide B) is moving relative to the mounted contact lens first at an acceleration rate of 10 mm/s$^2$ along a path of about 25 mm and then at a deceleration rate of 10 mm/s$^2$ along a path of about 25 mm.

The instrument measures the applied normal force (FN) acting on the contact lens against the counter surface and the tangential force (FT) resulting from reciprocating motion of the lens/counter-surface relative to each other. Any load cells can be used in the invention. Preferably, strain gage load cells are used. In the examples below, Transducer Techniques GSO-30-C 0-30g load cell is used as tangential load cell for measuring FT; Transducer Techniques GSO-100-C 0-100g load cells are used as load cells for measuring FN which is applied onto the contact lens. In the experiments described later, the applied normal force typically corresponds to about 700 mg to about 1000 mg (preferably around 800 mg to 900 mg). The FN and FT are measured by using Transducer Techniques T13000 Transducer Indicator, Transducer Techniques TMO-3 amplifier/conditioner modules, and National Instruments PCI-6035E Multifunction DAQ analog input.

Data (FT) as a function of sliding velocity are acquired at a sampling rate of 40 Hz (i.e., 25 ms per point) over 10 cycles. Almost 4000 data points are collected.

In accordance with the invention, a means to characterize the CoF response curve is by grouping (binning) the data into categories based on sliding velocity. If the boundaries defining the bins are arranged such that the bins follow a logarithmic progression then the log nature of the sliding velocity axis can be preserved in the transformation of the continuous sliding velocity variable into a categorical variable, thus controlling the weighting of the average value. The advantage of this approach is that the statistical algorithms from Analysis of Variance (ANOVA) and General Linearized Models (GLM) can be utilized to characterize the response curves. ANOVA/GLM analysis provides convenient means of comparison among measurements from within a population of lens samples and between populations of lenses. The analysis can provide average coefficient of friction at individual sliding velocity categories and overall average coefficient of friciton over the range of sliding velocity categories. ANOVA/GLM also permits the effect of the uncontrolled but monitored covariant factors, such as applied normal force, to be taken into account. Additionally the ANOVA/GLM algorithms provide the statistics that permit robust, quantitative comparisons of the average coefficients of friction that are calculated. The features listed above make ANOVA/GLM the preferred characterization approach.

As an illustrative example, ANOVA/GLM algorithms is used for the analysis of collected data by binning the sliding velocities in the study into groups based on a logarithmic progression. ANOVA refers to analysis of variance, and GLM refers to general linear model. This approach is an approximation regarding the statistical assumptions used to develop the ANOVA/GLM algorithms but offers a convenient and reasonable means of comparison of the large amounts of data generated in VP experiments. In the examples described below, data are binned into the following groups: group 1 ($v_i^s \leq 0.1$ mm/s); group 2 (0.1 mm/s$<v_i^s \leq 0.25$ mm/s); group 3 (0.25 mm/s$<v_i^s \leq 0.50$ mm/s); group 4 (0.50 mm/s$<v_i^s \leq 0.75$ mm/s); group 5 (0.75 mm/s$<v_i^s \leq 1.00$ mm/s); group 6 (1.00 mm/s$<v_i^s \leq 2.50$ mm/s); group 7 (2.50 mm/s$<v_i^s \leq 5.00$ mm/s); group 8 (5.00 mm/s<$v_i^s$≤7.50 mm/s); group 9 (7.50 mm/s<$v_i^s$≤10.00 mm/s); group 10 (10.00 mm/s<$v_i^s$≤12.50 mm/s); group 11 (12.50 mm/s<$v_i^s$≤15.00 mm/s); group 12 (15.00 mm/s<$v_i^s$≤17.50 mm/s); group 13 (17.50 mm/s<$v_i^s$≤20.00 mm/s); group 14 (20.00 mm/s<$v_i^s$≤22.50 mm/s); and group 15 (22.50 mm/s<$v_i^s$≤25.00 mm/s). All the data (FT/FN) in each groups is averaged to obtain an average CoF($v_i^s$, 1=1, 2, . . . , 15) at the upper limit of sliding speed $v_i^s$ (i=1, 2, . . . , 15) in each group. The velocity-weighted average coefficient of friction, $\overline{CoF_v}$, is calculated approximately according to the numerical method represented by the following equation $$\overline{CoF_v} = \left[\sum_{i=1}^{15} CoF(v_i^S) \times (\log v_{i+1}^S - \log v_i^S)\right]/25.00$$

The values of velocity-weighted average coefficient of friction, $\overline{CoF_v}$ obtained for each of 2 or more (preferably from 3 to 10) contact lenses under test are averaged and the averaged value is used to characterize the lubricity of the contact lenses under test.

The response FT/FN as a function of sliding velocity can be referred to as a Stribeck response curve. The Stribeck response is typically not a single number but varies with sliding velocity if the range of sliding velocities surveyed is sufficiently large. Characteristics of the Stribeck response can be used to simplify the comparisons between experiments. The maximum and minimum values of FT/FN and the inflexion point of the transition through the mixed lubrication regime are examples of useful parameters for comparison.

It is understood that the average coefficient of friction can be calculated by integrating the FT/FN verses log of sliding velocity response curve plot and dividing the integral by the range of sliding velocity observed. The resulting integral represents a weighted average coefficient of friction.

Another path to ranking and comparing material responses under similar experimental conditions is to utilize the approach of a Force Ratio Index (FRI). Calculation of the Force Ratio Index (FRI) is obtained by normalizing the values of velocity-weighted average coefficient of friction, $\overline{CoF_v}$, to that for a reference lens (e.g., DAILIES TOTAL1).

EXAMPLE 2

Oxygen Permeability Measurements

The apparent oxygen permeability ($Dk_{app}$), the apparent oxygen transmissibility (Dk/t), the intrinsic (or edge-corrected) oxygen permeability ($Dk_c$) of a lens and a lens material are determined according to procedures described in Example 1 of U.S. patent application publication No. 2012/0026457 A1 (herein incorporated by reference in its entirety).

Digital Rubbing Tests

The lenses are digitally rubbed (wearing disposable powder-free latex gloves) with RENU® multi-purpose lens care solution (or another multi-purpose lens care solution) for 20 seconds and then rinsed with saline. The above procedure is repeated for a given times, e.g., from 1 to 30 times, (i.e., number of repetitions of digital rubbing tests which imitate cleaning and soaking cycles).

Qualitative Evaluation of Lubricity

The lubricity of a lens can be evaluated qualitatively by using a finger-felt lubricity test which characterizes qualitatively the slipperiness of a lens surface on a friction rating scale of from 0 to 4. The higher the friction rating is, the lower the slipperiness (or lubricity).

Commercial lenses: DAILIES® TOTAL1®; ACUVUE® OASYS™; ACUVUE® ADVANCE PLUS™; DAILIES® Aqua Comfort Plus®; and AIR OPTIX®, are assigned a friction rating (designated "FR" hereinafter) of 0, 1, 2, 3, and 4 respectively. They are used as standard lenses for determining the friction rating of a lens under test.

The samples are placed in PBS for at least two rinses of 30 minutes each and then transferred to fresh PBS before the evaluation. Before the evaluation, hands are rinsed with a soap solution, extensively rinsed with DI water and then dried with KimWpe® towels. The samples are handled between the fingers and a numerical number is assigned for each sample relative to the above standard lenses described above. For example, if lenses are determined to be only slightly better than AIR OPTIX® lenses, then they are assigned a number 3. The value of a friction rating is one obtained by averaging the results of at least two friction ratings of a contact lens by two or more persons and/or by averaging the friction ratings of two or more contact lenses (from the identical batch of lens production) by one person.

Surface wettability Tests

Water contact angle (WCA) on a contact lens is a general measure of the surface wettability of a contact lens. In particular, a low water contact angle corresponds to more wettable surface. Average contact angles (Sessile Drop) of contact lenses are measured using a VCA 2500 XE contact angle measurement device from AST, Inc., located in Boston, Mass. This equipment is capable of measuring advancing contact angles ($\theta_a$) or receding contact angles ($\theta_r$) or sessile (static) contact angles. Unless specified, water contact angle is sessile (static) contact angle. The measurements are performed on fully hydrated contact lenses and immediately after blot-drying as follows. A contact lens is removed from the vial and washed 3 times in ~200 ml of fresh DI water in order to remove loosely bound packaging additives from the lens surface. The lens is then placed on top of a lint-free clean cloth (Alpha Wpe TX1009), dabbed well to remove surface water, mounted on the contact angle measurement pedestal, blown dry with a blast of dry air and finally the sessile drop contact angle is automatically measured using the software provided by the manufacturer. The DI water used for measuring the contact angle has a resistivity>18MΩcm and the droplet volume used is 2μl. Typically, uncoated silicone hydrogel lenses (after autoclave) have a sessile drop contact angle around 120 degrees. The tweezers and the pedestal are washed well with Isopropanol and rinsed with DI water before coming in contact with the contact lenses.

Water Break-up Time (WBUT) Tests

The surface hydrophilicity of lenses (after autoclave) is assessed by determining the time required for the water film to start breaking on the lens surface. Briefly, lenses are removed from the vial and placed in PBS (phosphate buffered saline) for at least two rinses of 30 minutes each and then transferred to fresh PBS in order to remove loosely bound packaging additives from the lens surface. The lens is removed from the solution and held against a bright light source. The time that is needed for the water film to break (de-wet) exposing the underlying lens material is noted visually. Uncoated lenses typically instantly break upon removal from PBS and are assigned a WBUT of 0 seconds. Lenses exhibiting WBUT≥10 seconds are considered to have a hydrophilic surface and are expected to exhibit adequate wettability (ability to support the tear film) on-eye.

EXAMPLE 3

Preparation of CE-PDMS Macromer

In the first step, α,ω-bis(2-hydroxyethoxypropyl)-polydimethylsiloxane (Mn=2000, Shin-Etsu, KF-6001a) is capped with isophorone diisocyanate (IPDI) by reacting 49.85 g of α,ω-bis(2-hydroxyethoxypropyl)-polydimethylsiloxane with 11.1 g IPDI in 150 g of dry methyl ethyl ketone (MEK) in the presence of 0.063g of dibutyltindilaurate (DBTDL). The reaction is kept for 4.5 h at 40° C., forming IPDI-PDMS-IPDI. In the second step, a mixture of 164.8 g of α,ω-bis(2-hydroxyethoxypropyl)-polydimethylsiloxane (Mn=3000, Shin-Etsu, KF-6002) and 50 g of dry MEK are added dropwise to the IPDI-PDMS-IPDI solution to which has been added an additional 0.063 g of DBTDL. The reactor is held for 4.5 h at about 40° C., forming HO-PDMS-IPDI-PDMS-IPDI-PDMS-OH. MEK is then removed under reduced pressure. In the third step, the terminal hydroxyl-groups are capped with methacryloyloxyethyl groups in a third step by addition of 7.77 g of isocyanatoethylmethacrylate (IEM) and an additional 0.063 g of DBTDL, forming IEM-PDMS-IPDI-PDMS-IPDI-PDMS-IEM (i.e., CE-PDMS terminated with methacrylate groups).

Preparation of Lens Formulations

A lens formulation is prepared by dissolving components in 1-propanol to have the following composition: CE-PDMS macromer prepared above (about 32 parts); N-[tris(trimethylsiloxy)-silylpropyl]acrylamide (about 21 parts); N,N-dimethylacrylamide (about 23); N-(carbonyl-methoxypolyethylene glycol-2000)-1,2-disteaoyl-sn-glycero-3-phosphoethanolamin, sodium salt) (about 0.6 parts); Darocur 1173 (about 1 parts); visitint (5% copper phthalocyanine blue pigment dispersion in tris(trimethylsiloxy)silylpropylmethacrylate, TRIS) (about 0.1 parts); 1,2-dimyristoyl-sn-glycero-3-phosphocholine (about 0.8 parts); 1-hydroxy-2,2,6,6-tetramethyl-piperidine (about 200 ppm); and 1-propanol (about 22 parts).

Preparation of Uncoated Contact Lenses

Lenses are prepared by cast-molding from the lens formulation prepared above in a reusable mold (quartz female mold half and glass male mold half), similar to the mold shown in FIGS. 1-6 in U.S. Pat. Nos. 7,384,590 and 7,387,759 (FIGS. 1-6). The lens formulation in the molds is irradiated with UV irradiation (13.0 mW/cm$^2$) for about 24 seconds. Cast-molded contact lenses are then extracted by dipping in the following series of baths: DI (deionized) water bath (about 56 seconds); 6 MEK baths (about 44, 56, 56, 56, 56, and 56 second respectively); and one DI water bath (about 56 seconds).

EXAMPLE 4

Preparation of Polymerizable Composition

A lens formulation (polymerizable composition) is prepared by mixing all the specified polymerizable components to have the following composition: MCR-M07 (34 parts); LM-CEPDMS (6 parts); NVP (40 parts); MMA (10 parts); EGMA (10 parts); TEGDMA (0.2 parts); AMA (0.1 parts); Norbloc (0.9 parts); Vazo 64 (0.5 parts); and RB 246 (0.01 parts).

MCR-M07 represents monobutyl-terminated monomethacryloxypropyl-terminated polydimethylsiloxane (M.W. 600 to 800 g/mol from Gelest); NVP represents N-vinyl pyrrolidone; MMA represents methyl methacrylate; TEGDMA represent triethyleneglycol dimethacrylate; EGDMA represents ethylene glycol methyl ether methacrylate; AMA represents allyl methacrylate; VAZO 64 represents 2,2'-dimethyl-2,2'azodipropiononitrile; Norbloc is 2-[3-(2H-Benzotriazol-2-yl)-4-hydroxyphenyl]ethyl methacrylate from Aldrich; RB246 is Reactive Blue 246 from Arran; LM-CEPDMS represents a di-methacrylate-terminated chain-extended polydimethylsiloxane (M.W. 6000 g/mol) which has three polydimethylsiloxane (PDMS) segments linked via diurethane linkages between two PDMS segments and is prepared according to method similar to what described in Example 2.

Preparation of Silicone Hydrogel Contact Lenses

A lens formulation is purged with nitrogen at room temperature for 30 to 35 minutes. The N$_2$-purged lens formulation is introduced into polypropylene molds and thermally cured under the following curing conditions: ramp from room temperature to 55° C. at a ramp rate of about 7° C./minute; holding at 55° C. for about 30 minutes; ramp from 55° C. to 80° C. at a ramp rate of about 7° C./minute; holding at 55° C. for about 30 minutes; ramp from 80° C. to 100° C. at a ramp rate of about 7° C./minute; and holding at 100° C. for about 30 minutes. The molds are opened and the molded lenses are removed from the molds.

EXAMPLE 5

Preparation of Lens Formulations

A lens formulation is prepared by dissolving components in 1-propanol to have the following composition: CE-PDMS macromer prepared in Example 3 (about 31.8 parts); N-[tris(trimethylsiloxy)-silylpropyl]acrylamide (about 19.7 parts); N,N-dimethylacrylamide (about 23.2 parts); N-(carbonyl-methoxypolyethylene glycol-2000)-1,2-disteaoyl-sn-glycero-3-phosphoethanolamin, sodium salt) (about 0.61 parts); Norbloc (about 0.55 parts); 2-hydroxy-5-methoxy-3-(5-(trifluoromethyl)-2H-benzo[d][1,2,3]triazol-2-yl)benzyl methacrylate (about 0.25 parts); Bis(4-methoxybenzoyl)diethylgermanium (about 0.6 parts); visitint (5% copper phthalocyanine blue pigment dispersion in tris(trimethylsiloxy)silylpropylmethacrylate, TRIS) (about 0.15 parts); 1,2-dimyristoyl-sn-glycero-3-phosphocholine (about 0.76 parts); Carbazole violet (about 60 ppm); and 1-propanol (about 23.1 parts).

Preparation of Uncoated Contact Lenses

Lenses are prepared by cast-molding from the lens formulation prepared above in a reusable mold (quartz female mold half and glass male mold half), similar to the mold shown in FIGS. 1-6 in U.S. Pat. Nos. 7,384,590 and 7,387,759 (FIGS. 1-6). The lens formulation in the molds is irradiated for 25 seconds using a 445 nm LED supplied by Opsytec. The measured total intensity from 200 to 800 nm is 54 mW/cm$^2$ (total intensity). Cast-molded contact lenses are then extracted by dipping in the following series of baths: DI water bath (about 56 seconds); 3 MEK baths (about 22, 78, and 224 second respectively); DI water bath (about 56 seconds).

EXAMPLE 6

PAA-coating Solution. A PAA coating solution is prepared by dissolving an amount of PAA (M.W.: 450 kDa, from Lubrizol) in a given volume of 1-propanol to have a concentration of about 0.40-0.44% by weight and the pH is adjusted with formic acid to about 1.7-2.3.

Phosphate Buffered Saline (PBS)

A phosphate buffered saline is prepared by dissolving $NaH_2PO_4\cdot H_2O$, $Na_2HPO_4\cdot 2H_2O$, and in a given volume of purified water (distilled or deionized) to have the following composition: about 0.04 w/w % $NaH_2PO_4\cdot H_2O$, about 0.39 w/w/% $Na_2HPO_4\cdot 2H_2O$, and about 0.79 w/w % NaCl.

IPC Saline

Five in-package-crosslinking salines for forming crosslinked hydrophilic coatings on silicone hydrogel contact lenses are prepared from polyamidoamine-epichlorohydrin (PAE) and a copolymer of acrylamide (AAm) and acrylic acid in a molar ratio of 10:1 (i.e., PAAm-PAA) (90/10)), in order to assess the effects of concentrations of PAE and PAAm-PAA and the conditions of heat pretreatment upon the lubricities of coated silicone hydrogel contact lenses. PAAm-PAA (90/10) partial sodium salt (~90% solid content, PAAm-PAA 90/10, Mw 200,000) is purchased from Polysciences, Inc. and used as received. PAE (Kymene, an azetidinium content of about 0.56 assayed with NMR) is purchased from Ashland as an aqueous solution and used as received. IPC salines are prepared as follows. A specific amount (indicated in Table 1) of PAAm-PAA(90/10), a specific amount (indicated in Table 1) of PAE, about 0.04 w/w % of $NaH_2PO_4\cdot H_2O$, about 0.39 w/w/% of $Na_2HPO_4\cdot 2H_2O$, and about 0.79 w/w % NaCl are dissolved in purified water (deionized or distilled water) and the pH of the resultant solution is adjusted to 7.4±0.1. Then the solution is heat pre-treated for a time period in specified in Table 1 at about 60° C. (heat pretreatment). During this heat pretreatment, PAAm-PAA and PAE are partially crosslinked to each other (i.e., not consuming all azetidinium groups of PAE) to form a water-soluble and thermally-crosslinkable hydrophilic polymeric material containing azetidinium groups within the branched polymer network in the IPC saline. After the heat pre-treatment, the IPC saline is filtered using a 0.22 micron polyether sulphone [PES] membrane filter and cooled down back to room temperature. About 5 ppm hydrogen peroxide is then added to the final IPC saline to prevent bioburden growth and the IPC saline is filtered using a 0.22 micron PES membrane filter. The prepared IPC saline is stored at 4° C. in a refrigerator until needed.

TABLE 1

| IPC Saline | PAE | PAAm-PAA | Time of Heat Pretreatment |
|---|---|---|---|
| IPC-CHC1 | 0.40% | 0.105% | 12 hours |
| IPC-CHC2 | 0.35% | 0.070% | 6 hours |
| IPC-CHC3 | 0.35% | 0.070% | 10 hours |
| IPC-CHC4 | 0.35% | 0.105% | 10 hours |
| IPC-CHC5 | 0.35% | 0.105% | 6 hours |

Lenses with PAA Base Coating.

Cast-molded contact lenses prepared in Example 5 are coated by dipping in the following series of baths: 3 MEK baths (about 22, 78, and 224 second respectively); DI water bath (about 56 seconds); one bath of PAA coating solution (about 0.44% by weight, acidified with formic acid to about pH 2.0) in 100% 1-propanol (about 44 seconds); one bath of a water/1-propanol 50%/50% mixture (about 56 seconds); one DI water bath (about 56 seconds); one PBS bath (about 56 seconds); and one DI water bath (about 168 seconds).

Lenses with Crosslinked Hydrophilic Coating.

Lenses having a PAA base coating thereon prepared above are placed in polypropylene lens packaging shells (one lens per shell) with 0.6 mL of PBS or one of the IPC salines (half of the saline is added prior to inserting the lens). The blisters are then sealed with foil and autoclaved for about 30 minutes at about 121° C., forming SiHy contact lenses with crosslinked coatings thereon in the presence of an IPC saline (no crosslinked hydrophilic coating is formed when the packaging saline is PBS). The coated Silicone hydrogel contact lenses are designated as PAA-coated, CHC1-coated, CHC2-coated, CHC3-coated, CHC4-coated, and CHC5-coated respectively, according to the saline used in forming the top crosslinked hydrophilic coating.

Quantitative Evaluation of Lubricity of Contact Lens

The coated contact lenses obtained above are tested quantitatively for lubricity according to the procedures described in Example 1. Data is collected under discrete sliding velocity protocol: Run 1 (0.05 mm/s); Run 2 (0.05 mm/s); Run 1 (0.05 mm/s); Run 1 (0.05 mm/s); Run 1 (0.05 mm/s); Run 1 (0.05 mm/s); Run 1 (0.10 mm/s); Run 3 (0.50 mm/s); Run 4 (1.00 mm/s); Run 5 (5.00 mm/s); Run 6 (10.00 mm/s); Run 7 (12.50 mm/s); Run 8 (15.00 mm/s); Run 9 (17.50 mm/s); Run 10 (20.00 mm/s). The results are reported in Table 2.

TABLE 2

| | | By Integration | | By ANOVA | |
|---|---|---|---|---|---|
| | | $\overline{CoF_v}$ | $\overline{CoF_v}$ (Normalized) | $\overline{CoF_v}$ | $\overline{CoF_v}$ (Normalized) |
| 2-1 | PAA | 0.074 | 1.00 | 0.072 | 1.00 |
| 2-2 | CHC1 | 0.116 | 1.57 | 0.096 | 1.33 |
| 2-3 | CHC2 | 0.178 | 2.41 | 0.130 | 1.81 |
| 2-4 | CHC3 | 0.263 | 3.71 | 0.167 | 2.32 |
| 2-5 | CHC4 | 0.274 | 3.55 | 0.177 | 2.46 |
| 2-6 | CHC5 | 0.421 | 5.69 | 0.225 | 3.13 |

$\overline{CoF_v}$ is equal to the integral area between 0.05 mm/s to 25 mm/s in the semilog graph of FT/F vs log(v) divided by 25 mm/s.

Figure 5:
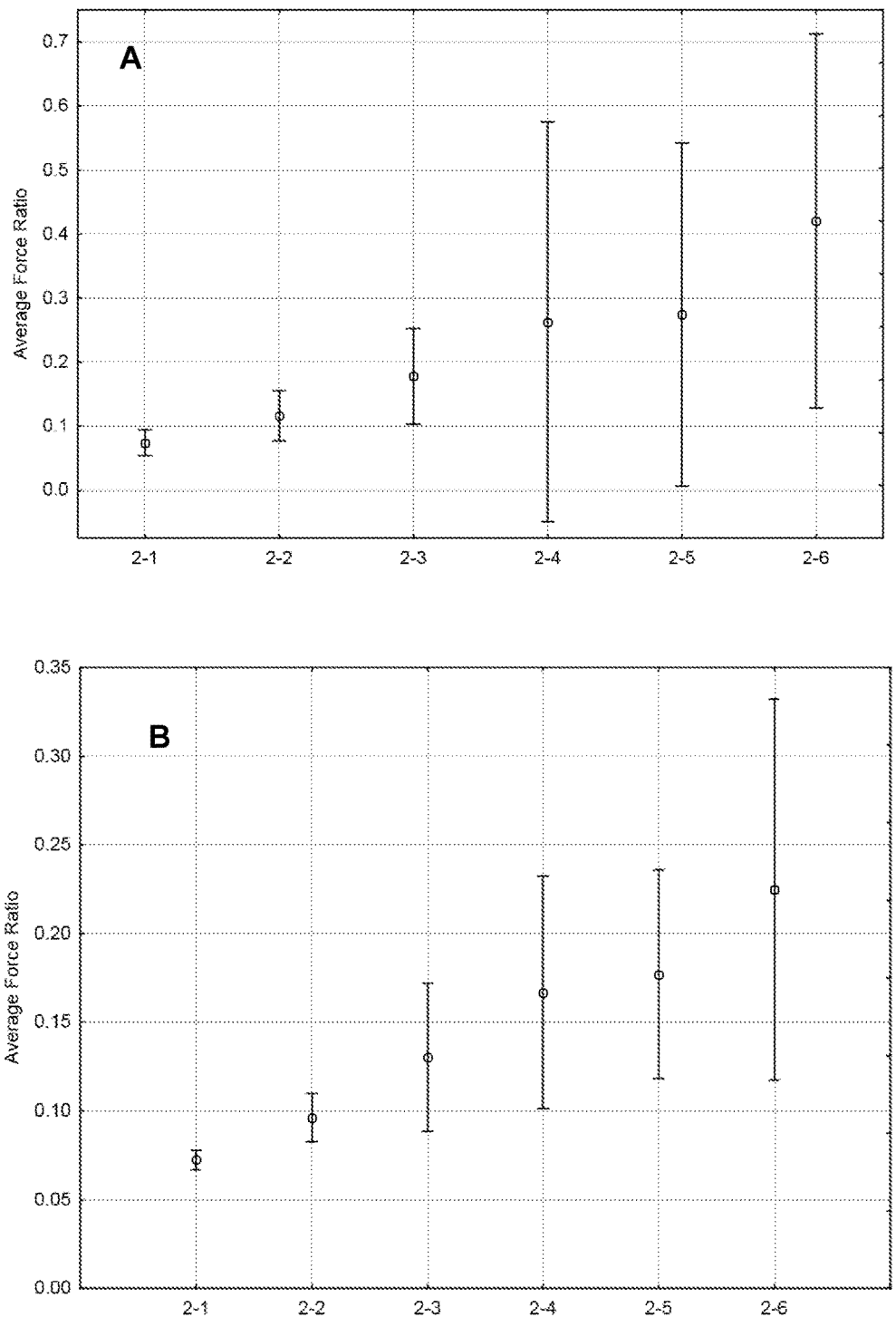
FIG. 5 shows $\overline{CoF_v}$ (i.e., averaged force ratio FT/FN) obtained for each types of lenses. A: by integration; B: by ANOVA.

FIG. 5 shows $\overline{CoF_v}$ (i.e., averaged force ratio FT/FN) obtained for each types of lenses. A: by integration; B: by ANOVA.

Figure 6:
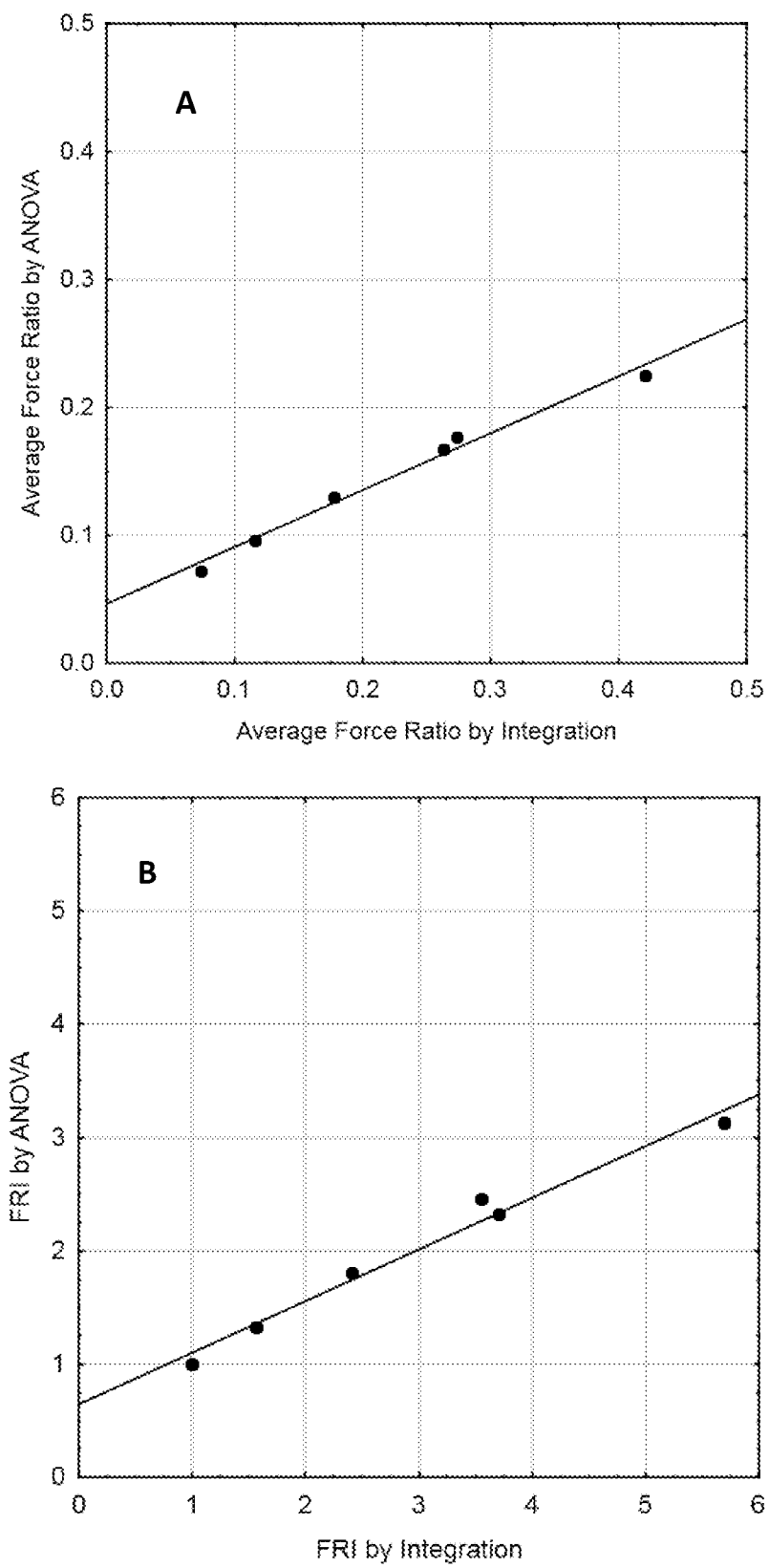
FIG. 6 shows the correlation between $\overline{CoF_v}$ obtained by integration and $\overline{CoF_v}$ obtained by ANOVA. A: $\overline{CoF_v}$ (i.e., averaged force ratio FT/FN); B: normalized $\overline{CoF_v}$.

FIG. 6 shows the correlation between $\overline{CoF_v}$ obtained by integration and $\overline{CoF_v}$ obtained by ANOVA. A: $\overline{CoF_v}$ (i.e., averaged force ratio FT/FN); B: normalized $\overline{CoF_v}$.

EXAMPLE 7

PAA-coating Solution. A PAA coating solution is prepared by dissolving an amount of PAA (M.W.: 450 kDa, from Lubrizol) in a given volume of 1-propanol to have a concentration of about 0.40-0.44% by weight and the pH is adjusted with formic acid to about 1.7-2.3.

Phosphate Buffered Saline (PBS)

The PBS prepared in Example 6 is used in this Example.

IPC Salines.

Five in-package-crosslinking salines are prepared from polyamidoamine-epichlorohydrin (PAE) and a copolymer of acrylamide (AAm) and acrylic acid in a molar ratio of 10:1 (i.e., PAAm-PAA 90/10), in order to form a series of coated silicone hydrogel contact lenses having different qualitative lubricities. PAAm-PAA (90/10) partial sodium salt (~90% solid content, Mw 200,000) is purchased from Polysciences, Inc. and used as received. PAE (Kymene, an azetidinium content of about 0.56 assayed with NMR) is purchased from Ashland as an aqueous solution and used as received. The compositions of these five IPC salines differs from each other in the concentration of PAAm-PAA (90/10) as shown in Table 3.

TABLE 3

| IPC Saline | Concentration (w/w %) | |
|---|---|---|
| | PAE | PAAm-PAA |
| IPC-LL-0 | 0.35% | 0.070% |
| IPC-LL-1 | 0.35% | 0.015% |
| IPC-LL-2 | 0.35% | 0.010% |
| IPC-LL-3 | 0.35% | 0.005% |
| IPC-LL-4 | 0.35% | 0.000% |

TABLE 4

| | | By ANOVA, All Cycles | | By ANOVA, Drop First Half Cycle | |
|---|---|---|---|---|---|
| | | $\overline{CoF_y}$ | $\overline{CoF_y}$ (Normalized) | $\overline{CoF_y}$ | $\overline{CoF_y}$ (Normalized) |
| 3-1 | LL0 | 0.158 | 1.00 | 0.151 | 1.00 |
| 3-2 | LL1 | 0.145 | 0.92 | 0.133 | 0.88 |
| 3-3 | LL2 | 0.266 | 1.68 | 0.264 | 1.75 |
| 3-4 | LL3 | 0.281 | 1.78 | 0.268 | 1.77 |
| 3-5 | LL4 | 0.407 | 2.58 | 0.390 | 2.58 |

An IPC saline is prepared as follows. A desired amount of PAAm-PAA (90/10), about 0.35% of PAE, about 0.04 w/w % of $NaH_2PO_4 \cdot H_2O$, about 0.39 w/w/% of $Na_2HPO_4 \cdot 2H_2O$, and about 0.79 w/w % NaCl are dissolved in purified water (deionized or distilled water) and the pH of the resultant solution is adjusted to 7.4±0.1. Then the solution is heat pre-treated for about 6 hours at about 60° C. (heat pretreatment). During this heat pretreatment, PAAm-PAA and PAE are partially crosslinked to each other (i.e., not consuming all azetidinium groups of PAE) to form a water-soluble and thermally-crosslinkable hydrophilic polymeric material containing azetidinium groups within the branched polymer network in the IPC saline. After the heat pre-treatment, the IPC saline is filtered using a 0.22 micron polyether sulphone [PES] membrane filter and cooled down back to room temperature. About 5 ppm hydrogen peroxide is then added to the final IPC saline to prevent bioburden growth and the IPC saline is filtered using a 0.22 micron PES membrane filter. The prepared IPC saline is stored at 4° C. in a refrigerator until needed.

Lenses with PAA Base Coating

Cast-molded contact lenses prepared in Example 3 are coated by dipping in the following series of baths: DI water bath (about 56 seconds); 6 MEK baths (about 44, 56, 56, 56, 56, and 56 second respectively); DI water bath (about 56 seconds); one bath of PAA coating solution (about 0.44% by weight, acidified with formic acid to about pH 2.0) in 100% 1-propanol (about 44 seconds); one bath of a water/1-propanol 50%/50% mixture (about 56 seconds); 4 DI water baths each for about 56 seconds; one PBS bath for about 56 seconds; and one DI water bath for about 56 seconds.

Lenses with Crosslinked Hydrophilic Coating

Lenses having a PAA base coating thereon prepared above are placed in polypropylene lens packaging shells (one lens per shell) with 0.6 mL of the IPC saline (half of the saline is added prior to inserting the lens). The blisters are then sealed with foil and autoclaved for about 30 minutes at about 121° C., forming SiHy contact lenses with crosslinked coatings thereon. The coated Silicone hydrogel contact lenses are designated as LL0, LL1, LL2, LL3, and LL4 respectively, according to the IPC saline used in forming the top crosslinked hydrophilic coating.

Qualitative Evaluation of Lubricity of Contact Lens

The coated contact lenses obtained above are tested qualitatively for lubricity according to the procedures described in Example 2. The results are: Friction rating (FR)=0 for LL0; FR=1 for LL1; FR=2 for LL2; FR=3 for LL3; and FR=4 for LL4.

Quantitative Evaluation of Lubricity of Contact Lens

The coated contact lenses obtained above are tested quantitatively for lubricity according to the procedures described in Example 1. Data is collected under Velocity Profile Protocol at an acceleration of 10 mm/s$^2$ and with a turn-around delay of 500 ms, along a path of 50 mm and 10 cycles. The results are reported in Table 4.

Figure 7:
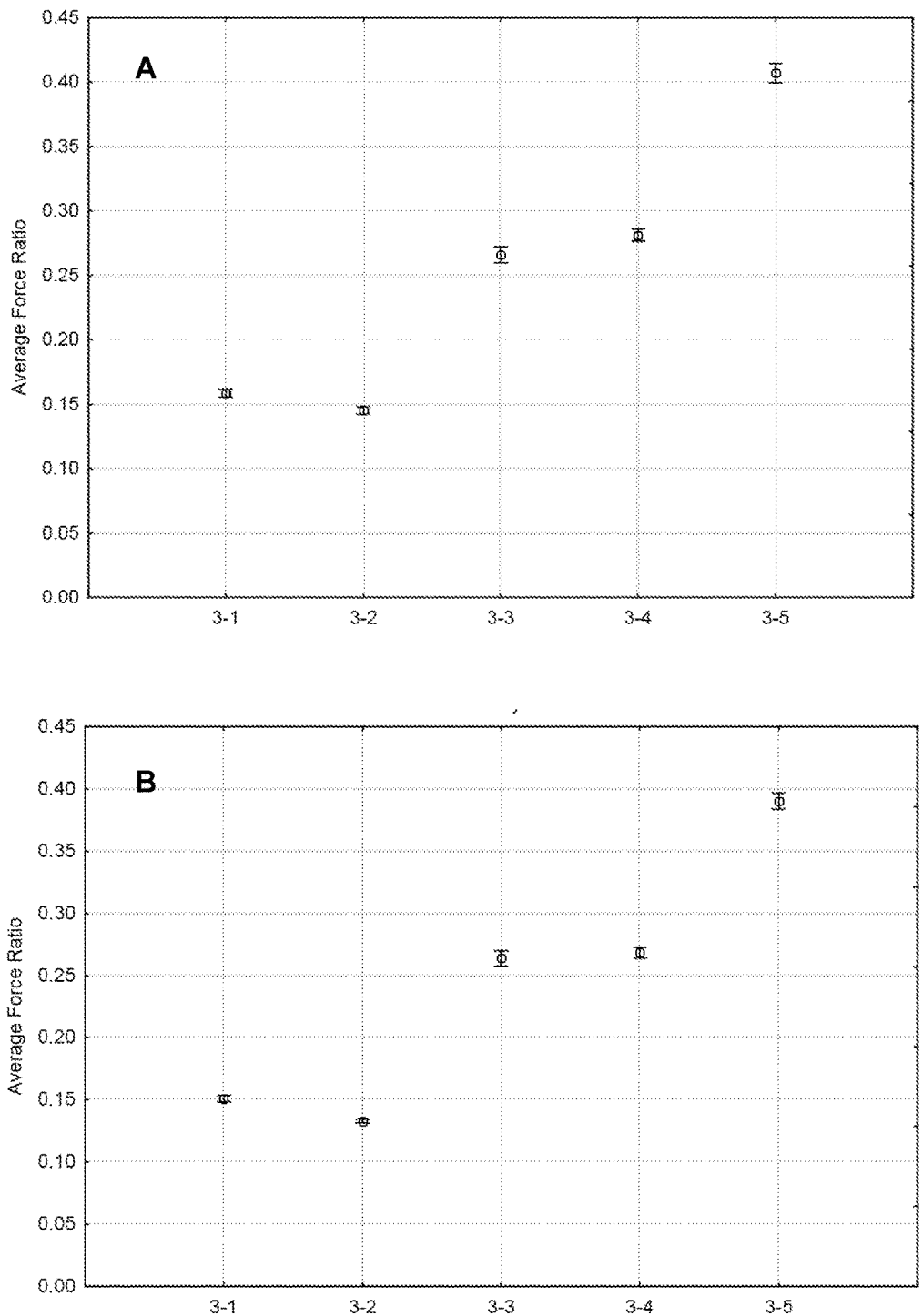
FIG. 7 shows $\overline{CoF_v}$ (i.e., averaged force ratio FT/FN) obtained by ANOVA for each types of lenses. A: based on all cycles; B: based on all cycles excluding the 1ˢᵗ half cycle.

FIG. 7 shows $\overline{CoF_y}$ (i.e., averaged force ratio FT/FN) obtained by ANOVA for each types of lenses. A: based on all cycles; B: based on all cycles excluding the 1$^{st}$ half cycle.

Figure 8:
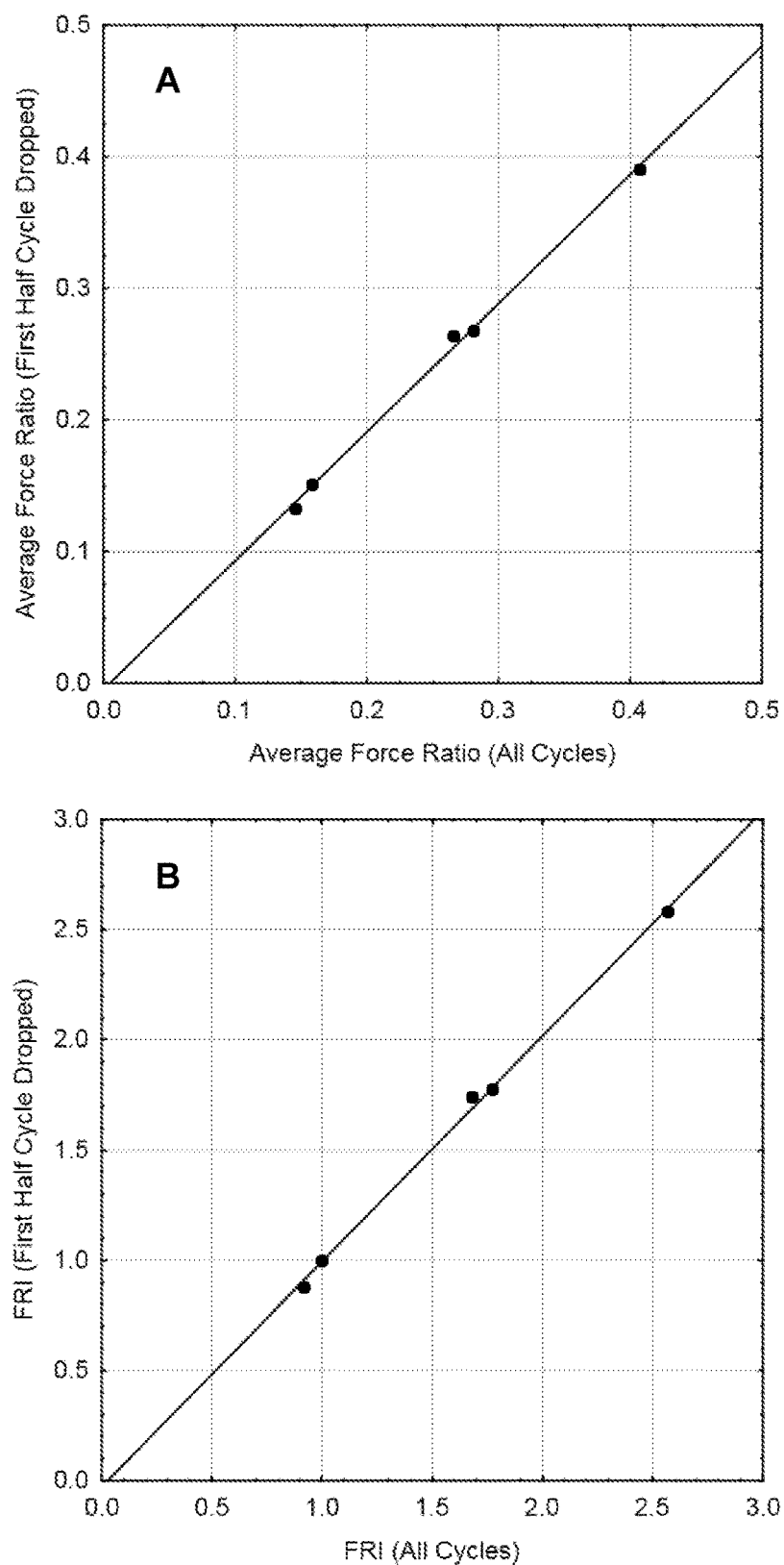
FIG. 8 shows the correlation between $\overline{CoF_v}$ obtained by ANOVA for all cycles and $\overline{CoF_v}$ obtained by ANOVA for all cycles excluding the 1ˢᵗ half cycle. A: $\overline{CoF_v}$ (i.e., averaged force ratio FT/FN); B: normalized $\overline{CoF_v}$.

FIG. 8 shows the correlation between $\overline{CoF_y}$ obtained by ANOVA for all cycles and $\overline{CoF_y}$ obtained by ANOVA for all cycles excluding the 1$^{st}$ half cycle. A: $\overline{CoF_y}$ (i.e., averaged force ratio FT/FN); B: normalized $\overline{CoF_y}$.

EXAMPLE 8

Preparation of PAA Aqueous Solution

An aqueous solution of polyacrylic acid (PAA) is prepared by dissolving an amount of PAA (M.W. 250000) in purified water (distilled or deionized water). The pH is adjusted by adding formic acid to the PAA aqueous solution to about 2.0. The concentration of PAA is about 0.5% by weight. The prepared PAA aqueous solution is filtered by using a VWR#28306-153 Filter paper (Particle Retention size=10 um) to remove any particulate or foreign matter.

PBS

The PBS prepared in Example 6 is used in this Example.

IPC Saline

PAAm-PAA (90/10) partial sodium salt (~90% solid content, Mw 200,000) is purchased from Polysciences, Inc. and used as received. PAE (Kymene, an azetidinium content of 0.46 assayed with NMR) is purchased from Ashland as an aqueous solution and used as received. An IPC saline is prepared by dissolving about 0.07% w/w of PAAm-PAA (90/10) and about 0.15% of PAE (an initial azetidinium millimolar equivalents of about 8.8 millimole) in PBS prepared above and adjusting the pH to 7.2~7.4. Then the IPC saline is heat pre-treated for about 7 hours at about 70° C. (heat pretreatment). During this heat pretreatment, PAAm-PAA and PAE are partially crosslinked to each other (i.e., not consuming all azetidinium groups of PAE) to form a water-soluble and thermally-crosslinkable hydrophilic polymeric material containing azetidinium groups within the branched polymer network in the IPC saline. After the heat pre-treatment, the IPC saline is filtered using a 0.22 micron PES membrane filter and cooled down back to room temperature. 10 ppm hydrogen peroxide is then added to the final IPC saline to prevent bioburden growth and the IPC saline is filtered using a 0.22 micron PES membrane filter.

PAA-coated Lenses

After demolding, silicone hydrogel contact lenses prepared in Example 4 are subjected to a 5-step coating process to form PAA coatings (i.e., base coatings) on the silicone hydrogel contact lenses. In this coating process, the silicone hydrogel contact lenses are first immersed in PBS for about 60 minutes at room temperature, second immersed in the PAA solution prepared above for about 60 minutes at room temperature, third rinsed with PBS for about 5 minutes at room temperature; fourth immersed in the PAA solution prepared above for about 30 minutes at room temperature, and fifth rinsed with PBS for about 5 minutes at room temperature.

Application of Crosslinked Coating

SiHy lenses having a PAA base coating thereon prepared above are placed in polypropylene lens packaging shells (or blisters) (one lens per shell) with 0.6 mL of the IPC saline (half of the saline is added prior to inserting the lens). The blisters are then sealed with foil and autoclaved for about 30 minutes at about 121° C., forming SiHy contact lenses with crosslinked coatings (PAA-x-hydrophilic polymeric material) thereon.

Quantitative Evaluation of Lubricity of Contact Lens (DDT2)

DDT2 lenses are tested quantitatively for lubricity according to the procedures described in Example 1. Data is collected under Velocity Profile Protocol at an acceleration of 10 mm/s$^2$ and with a turn-around delay of 500 ms, along a path of 50 mm and 10 cycles. The $\overline{CoF_v}$ obtained by ANOVA is 0.423.

EXAMPLE 9

Quantitative Evaluation of Lubricity of Commercial Contact Lenses

The following commercial silicone hydrogel contact lenses: DAILIES TOTAL1 (Alcon), AirOptix (Alcon)(lotrafilcon B), ACUVUE OASYS (Johns & Johnson); ACUVUE TRUEYE (Johns & Johnson); Biofinity (CooperVision) are tested for lubricity according to the procedures described in Example 1. Data is collected under Velocity Profile Protocol at an acceleration of 10 mm/s$^2$ and with a turn-around delay of 500 ms, along a path of 50 mm and 10 cycles. The $\overline{CoF_v}$ is obtained by ANOVA over all cycles. The results are reported in Table 5.

TABLE 6

|  | $CoF_v$ | $\overline{CoF_v}$ (normalized) |
| --- | --- | --- |
| DT1 | 0.130 | 1.00 |
| Lotrafilcon B | 0.308 | 2.36 |
| TruEye | 0.430 | 3.30 |
| Biofinity | 0.438 | 3.36 |
| Oasys | 0.482 | 3.70 |

What is claimed is:

1. A method for producing contact lenses according to procedure (I) or (II),
wherein procedure (I) comprises the steps of: (a) obtaining preformed contact lenses; (b) selecting a surface treatment or a combination of two or more surface treatments, coating materials, and coating conditions under which the selected coating materials can be applied onto a contact lens according to the selected surface treatment or the selected combination of the two or more surface treatments to obtain a coated contact lens having a first target lubricity profile as characterized by having a first velocity-weighted average coefficient of friction, $\overline{CoF_v}$, of about 450×10$^{-3}$ or less; and (c) applying the selected coating materials onto the preformed contact lenses under the selected coating conditions to form the contact lenses each having the first target lubricity profile,
wherein procedure (II) comprises the steps of: (a) selecting a mold material for making lens molds; (b) selecting a lens formulation and curing conditions under which the selected lens formulation can be cured in the selected mold under the selected curing conditions to form a contact lens having a second target lubricity profile as characterized by having a second velocity-weighted average coefficient of friction, $\overline{CoF_v}$, of about 450×10$^{-3}$ or less, wherein the lens formulation comprises at least one lubricating agent for imparting the second target lubricity profile to the formed contact lens; and (c) introducing and curing the selected lens formulation in the lens molds to form the contact lenses each having the second target lubricity profile,
wherein $\overline{CoF_v}$ is calculated according to Equation (1)

$$\overline{CoF_v} = \int_{v_0^s}^{v_f^s} \frac{CoF(v_i^s)}{v_i^s} d(v_i^s) \quad (1)$$

in which $CoF(v_i^s)$ is coefficient of friction $$\left(\frac{FT(v_i^s)}{FN}\right)$$

measured at a sliding speed $v_i^s$, FN is the applied normal force acting on a testing lens under test against a standard counter surface of a standard substrate, and $FT(v_i^s)$ is a tangential force or horizontal force resulted from the sliding motion of the testing lens relative to the standard counter surface at the sliding speed $v_i^s$ which is generated by reciprocally moving the standard substrate relative to the testing lens first at an acceleration rate of 10 mm/s$^2$ along a path of about 25 mm and then at a deceleration rate of 10 mm/s$^2$ along a path of about 25 mm.

2. The method of claim 1, wherein the first and second velocity-weighted average coefficients of friction independent of each other are about 350×10$^{-3}$ or less.

3. The method of claim 1, wherein the contact lens is produced according procedure (I).

4. The method of claim 3, wherein the preformed contact lenses are non-silicone hydrogel contact lenses.

5. The method of claim 3, wherein the preformed contact lenses are silicone hydrogel contact lenses.

6. The method of claim 3, wherein the selected surface treatment of the selected combination of the two or more surface treatments comprises a plasma treatment, a graft-polymerization of one or more hydrophilic vinylic monomers and/or macromers, a layer-by-layer deposition of one or more first hydrophilic polymeric materials, covalently attachment of one or more second hydrophilic polymeric materials, or a combination thereof.

7. The method of claim 6, wherein the plasma treatment is carried out under low pressure and is a process of plasma-induced polymerization, a plasma grafting, plasma oxidation, or combination thereof.

8. The method of claim 6, wherein the plasma treatment is carried out at a surrounding atmospheric pressure.

9. The method of claim 6, wherein the one or more first hydrophilic polymeric materials comprise at least one polyanionic material selected from the group consisting of polyacrylic acid, polymethacrylic acid, polyethylacrylic acid, poly(acrylic acid-co-methacrylic acid), poly(acrylic acid-co-ethacrylic acid), poly(methacrylic acid-co-ethacrylic acid), and a mixture thereof.

10. The method of claim 6, wherein the graft-polymerization is carried out with one or more hydrophilic vinylic monomers selected from the group consisting of acrylamide, N,N-dimethylacrylamide (DMA), N,N-dimethylmethacrylamide (DMMA), 2-acrylamidoglycolic acid, N-hydroxypropylacrylamide, N-hydroxyethyl acrylamide, N-[tris(hydroxy methyl)methyl]-acrylamide, N-vinylpyrrolidone, N-vinyl formamide, N-vinyl acetamide, N-vinyl isopropylamide, N-vinyl-N-methyl acetamide, N-methyl-3-methylene-2-pyrrolidone, 1-methyl-5-methylene-2-pyrrolidone, 5-methyl-3-methylene-2-pyrrolidone, 2-hydroxyethylmethacrylate (HEMA), 2-hydroxyethyl acrylate (HEA), trimethylammonium 2-hydroxy propylmethacrylate hydrochloride, aminopropyl methacrylate hydrochloride, dimethylaminoethyl methacrylate (DMAEMA), glycerol methacrylate (GMA), a $C_1$-$C_4$-alkoxy polyethylene glycol (meth)acrylate having a number average molecular weight of up to 1500, (meth) acrylic acid, and mixtures thereof) in the presence or absence of a hydrophilic crosslinking agent.

11. The method of claim 6, wherein the coating of each contact lenses comprises a reactive base coating reactive functional groups and a hydrogel coating on top of the reactive base coating, wherein the reactive base coating is: an LbL coating, a plasma coating, combination of a plasma coating and an LbL coating thereon; a layer of one or more hydrophilic polymers obtained by covalently attachment or graft polymerization; combination of a layer of one or more hydrophilic polymers and an LbL coating thereon; or combination of plasma coating, a layer of one more hydrophilic polymers on top of the plasma coating, and an LbL coating on top of the layer of one or more hydrophilic polymers.

12. The method of claim 11, wherein the hydrogel top coating is obtained by heating a contact lens with a reactive base coating thereon in a solution comprising a water-soluble and thermally-crosslinkable hydrophilic polymeric material at a temperature of from about 60° C. to about 140° C. for a time period sufficient long to crosslink the water-soluble thermally-crosslinkable hydrophilic polymeric material and the base coating so as to form a hydrogel coating on the contact lens.

13. The method of claim 12, wherein the water-soluble and thermally-crosslinkable hydrophilic polymeric material is a poly(2-oxazoline-co-ethyleneimine)-epichlorohydrin, a chemically-modified poly(2-oxazoline-co-ethyleneimine)-epichlorohydrin, a chemically-modified polyamidoamine-epichlorohydrin, or combinations thereof, wherein the chemically-modified poly(2-oxazoline-co-ethyleneimine)-epichlorohydrin or the chemically-modified polyamidoamine-epichlorohydrin comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetitdinium group of the polyamidoamine-epichlorohydrin or the poly (2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains.

14. The method of claim 1, wherein the contact lens is produced according procedure (II).

15. The method of claim 14, wherein the lens formulation comprises at least one N-vinyl type vinylic monomer.

16. The method of claim 15, wherein the N-vinyl type vinylic monomer is N-vinylpyrrolidone, N-vinyl acetamide, N-vinyl-N-methyl acetamide, or combinations thereof.

17. The method of claim 14, wherein the lens formulation comprises at least one non-crosslinkable hydrophilic polymer having a number average molecular weight $M_w$ of from 5,000 to 1,000,000 Daltons.

18. A method of manufacturing contact lenses, comprising the step of:
inspecting manufactured contact lenses for having a target lubricity profile as characterized by having a velocity-weighted average coefficient of friction, $\overline{CoF_v}$, of about $450\times10^{-3}$ or less; and discarding those contact lenses which do not have the target lubricity,
wherein $\overline{CoF_v}$ is calculated according to Equation (1)

$$\overline{CoF_v} = \int_{v_0^S}^{v_f^S} \frac{CoF(v_i^S)}{v_i^S} d(v_i^S) \qquad (1)$$

in which $CoF(v_i^s)$ is coefficient of friction $$\left(\frac{FT(v_i^S)}{FN}\right)$$

measured at a sliding speed $v_i^s$, FN is the applied normal force acting on a testing lens under test against a standard counter surface of a standard substrate, and $FT(v_i^s)$ is a tangential force or horizontal force resulted from the sliding motion of the testing lens relative to the standard counter surface at the sliding speed $v_i^s$ which is generated by reciprocally moving the standard substrate relative to the testing lens first at an acceleration rate of 10 mm/s² along a path of about 25 mm and then at a deceleration rate of 10 mm/s² along a path of about 25 mm.

19. The method of claim 18, wherein the inspecting step is conducted by statistical sampling or conducted continuously on production line.

* * * * *